(12) United States Patent
Ikuno et al.

(10) Patent No.: US 12,210,787 B2
(45) Date of Patent: Jan. 28, 2025

(54) SERVER APPARATUS THAT DETERMINES IF PRINT DATA HAS NOT BEEN PRINTED AND TRANSMITS UNPRINTED PRINT DATA TO THE PRINTING APPARATUS

(71) Applicant: CANON KABUSHIKI KAISHA, Tokyo (JP)

(72) Inventors: Takao Ikuno, Ibaraki (JP); Masaru Ono, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/454,675

(22) Filed: Aug. 23, 2023

(65) Prior Publication Data

US 2024/0069835 A1 Feb. 29, 2024

(30) Foreign Application Priority Data

Aug. 25, 2022 (JP) ................. 2022-134077

(51) Int. Cl.
*G06F 3/12* (2006.01)
(52) U.S. Cl.
CPC ............ *G06F 3/126* (2013.01); *G06F 3/1204* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 2007/0195364 A1* | 8/2007 | Umehara | ................ | H04L 41/34 358/1.15 |
| 2014/0118777 A1* | 5/2014 | Yamamoto | ............ | G06F 3/1238 358/1.15 |
| 2014/0146343 A1* | 5/2014 | Matsumura | ........... | G06F 3/1238 358/1.14 |

FOREIGN PATENT DOCUMENTS

| | | | |
|---|---|---|---|
| JP | 2009116599 A | | 5/2009 |
| JP | 2015012336 A | * | 1/2015 |

OTHER PUBLICATIONS

English translation of JP-2015012336-A. (Year: 2015).*

* cited by examiner

*Primary Examiner* — Thomas D Lee
(74) *Attorney, Agent, or Firm* — Canon U.S.A., Inc. IP Division

(57) ABSTRACT

A server apparatus includes a storage medium configured to store print target data and information indicating whether the print target data has been printed and a processor configured to determine, based on the stored information, whether there is print target data that has not been printed by a printing apparatus and transmit the print target data to the printing apparatus, in a case that it is determined that there is the print target data that has not been printed by the printing apparatus.

8 Claims, 15 Drawing Sheets

FIG. 4
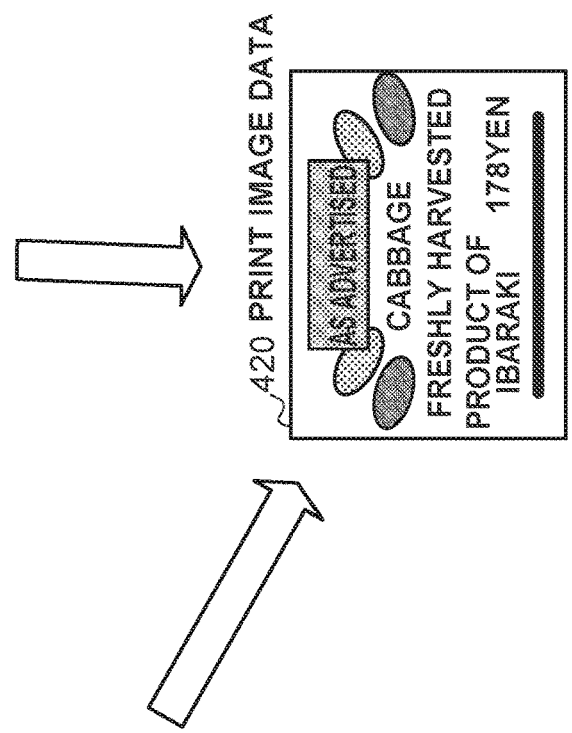
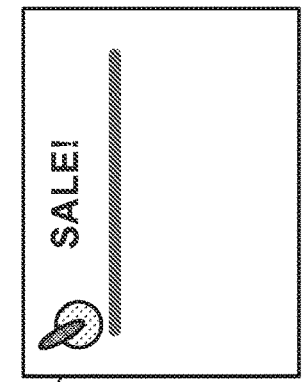
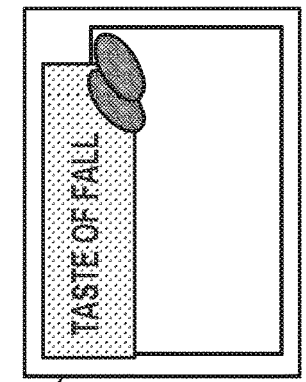
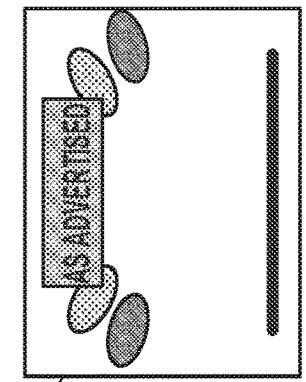

| No. | PRODUCT NAME | PLACE OF PRODUCTION | FRAME No. | REMARKS | PRICE | PERIOD OF VALIDITY |
|---|---|---|---|---|---|---|
| 001 | CABBAGE | PRODUCT OF IBARAKI | 003 | FRESHLY HARVESTED | 178YEN | 202x/01/01~202x/01/03 |
| 002 | TOMATOES | PRODUCT OF CHIBA | 003 | SPECIAL BUY | 258YEN | 202x/01/01~202x/01/03 |
| 003 | MUSHROOMS | PRODUCT OF TOCHIGI | 002 | FRESHLY HARVESTED | 249YEN | 202x/01/04~202x/01/08 |
| 004 | RADISH | PRODUCT OF CHIBA | 001 | FOR HOT POT | 128YEN | 202x/01/04~202x/01/08 |

| No. | STORE NAME | 001 | | 002 | | 003 | | 004 | |
|---|---|---|---|---|---|---|---|---|---|
| | | TARGET | STATE | TARGET | STATE | TARGET | STATE | TARGET | STATE |
| | xxx STORE 1 | ○ | NOT PRINTED | ○ | NOT PRINTED | ○ | UPDATED | ○ | NOT PRINTED |
| | xxx STORE 2 | ○ | NOT PRINTED | ○ | NOT PRINTED | × | — | × | — |
| | xxx STORE 3 | × | — | ○ | NOT PRINTED | × | — | ○ | NOT PRINTED |
| | yyy STORE 1 | × | — | ○ | PRINTED | ○ | PRINTED | ○ | PRINTED |
| | yyy STORE 2 | × | — | × | — | ○ | NOT PRINTED | ○ | NOT PRINTED |

FIG. 7A

POP DISTRIBUTION SERVER REGISTRATION — 700

URL OF POP DISTRIBUTION SERVER — 701

| STORE ID | 001 |
| LOGIN ID | xxx001tenpo |
| PASSWORD | •••••••• |

— 702

POP PRINT FUNCTION | ENABLED — 703

(REGISTER) — 704

FIG. 7B

ONE-BUTTON POP PRINT SETTING — 710

● PRINT ONLY NEWLY ADDED POP DISPLAYS
○ PRINT NEWLY ADDED POP DISPLAYS AND UPDATED POP DISPLAYS
— 711

● PRINT ALL POP DISPLAYS MATCHING UPDATE CONDITION
○ PRINT POP DISPLAYS MATCHING UPDATE CONDITION AND WITHIN PERIOD OF VALIDITY
○ PRINT POP DISPLAYS MATCHING UPDATE CONDITION AND PRIOR TO OR WITHIN PERIOD OF VALIDITY
FROM [ 2 ] DAYS BEFORE
— 712

— 713

(REGISTER) — 714

FIG. 7C

NEW POP NOTIFICATION SETTING — 720

NEW POP NOTIFICATION FUNCTION: ENABLED — 721

LED LAMP: ENABLED — 722

BUZZER SOUND: DISABLED — 723

MAIN MENU — 730

(COPY) — 731a    (FAX) — 731b    (EMAIL) — 731c (POP PRINTING) — 732

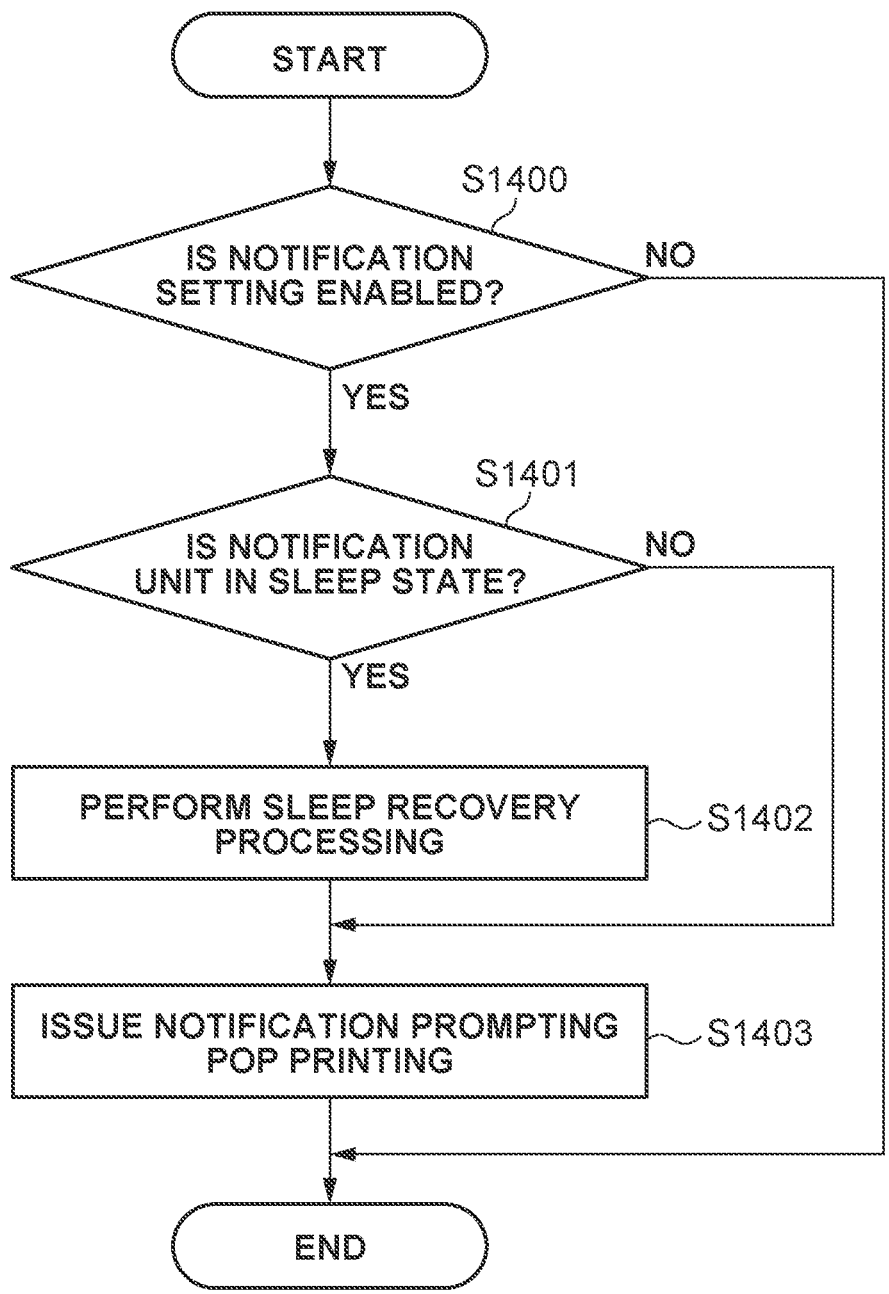

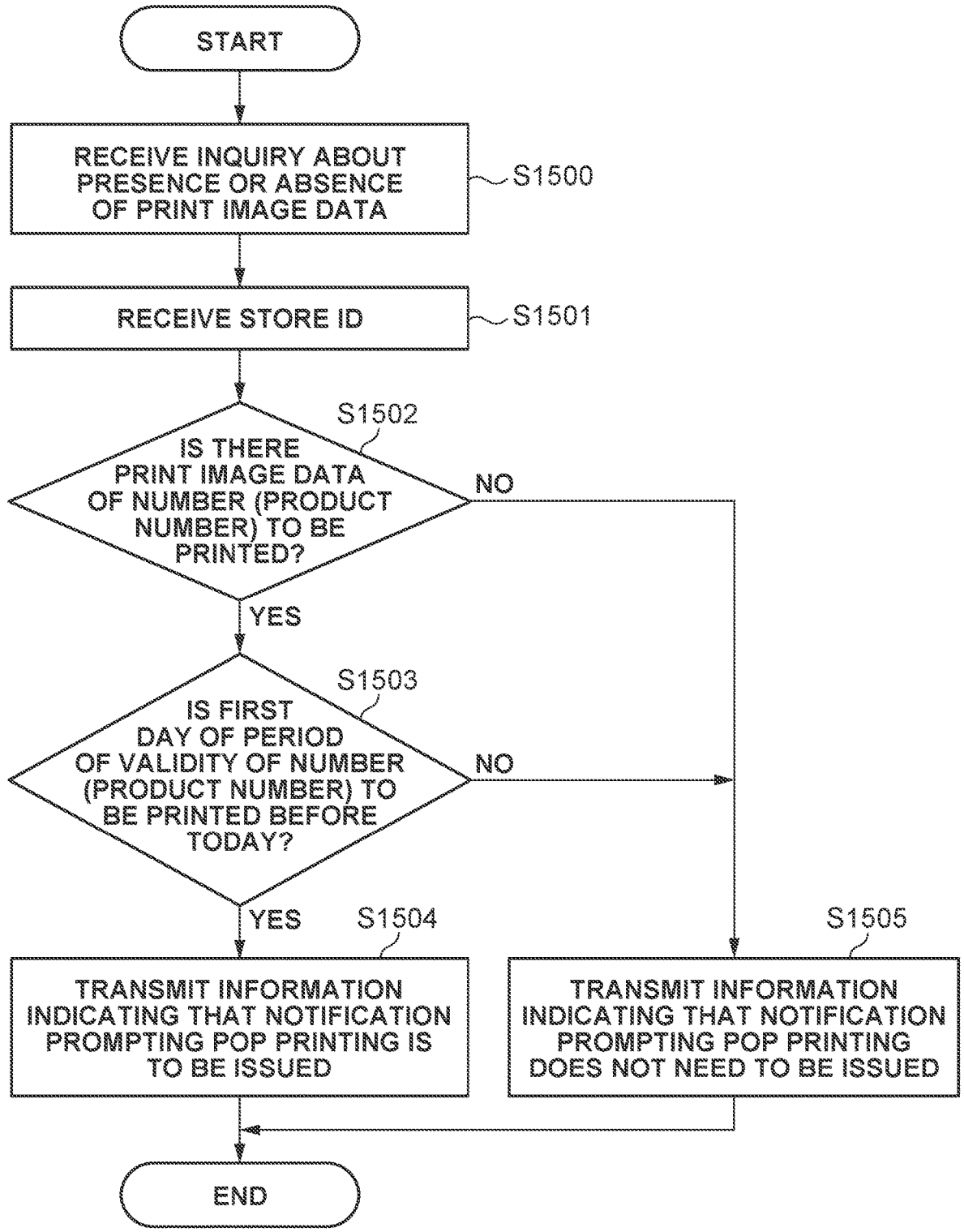

SERVER APPARATUS THAT DETERMINES IF PRINT DATA HAS NOT BEEN PRINTED AND TRANSMITS UNPRINTED PRINT DATA TO THE PRINTING APPARATUS

BACKGROUND

Field of the Disclosure

The present disclosure relates to a server apparatus, a printing apparatus, and a printing system.

Description of the Related Art

Some printing systems include a server that distributes print target data and printing apparatuses that can perform network communication with the server. In such a printing system, each printing apparatus receives print target data from the server and prints the print target data. Japanese Patent Application Laid-Open No. 2009-116599 discusses enabling exchange of print target data between printing apparatuses via a server.

However, according to the technique discussed in Japanese Patent Application Laid-Open No. 2009-116599, a user of a printing apparatus specifies a job (header information about the job) to be printed again by operating the operation unit of the printing apparatus. This may cause an operational burden on the user of the printing apparatus.

SUMMARY

According to an aspect of the present disclosure, a server apparatus includes a storage medium configured to store print target data and information indicating whether the print target data has been printed and a processor configured to determine, based on the stored information, whether there is print target data that has not been printed by a printing apparatus and transmit the print target data to the printing apparatus, in a case that it is determined that there is the print target data that has not been printed by the printing apparatus.

Further features of the present disclosure will become apparent from the following description of embodiments with reference to the attached drawings.

BRIEF DESCRIPTION OF THE DRAWINGS

FIG. 4 is a diagram illustrating the configuration of print image data.

FIGS. 6A and 6B are diagrams illustrating print configuration information and status information.

FIGS. 7A to 7D are diagrams illustrating a GUI displayed on the printing apparatus in making print settings.

FIG. 14 is a flowchart illustrating the processing of step S1302.

FIG. 15 is a flowchart illustrating an operation of the data distribution server upon reception of an inquiry from the printing apparatus.

DESCRIPTION OF THE EMBODIMENTS

Displays, such as a point of purchase (POP) display, are used in stores as a method for posting product descriptions and prices. For a large number of stores like chain stores, it is inefficient to create print target data from scratch in each of the stores. In view of this, print target data for all the stores can be stored in a server installed in the headquarters of the chain stores and distributed from the server to the stores, for example. In such a case, the server in the headquarters stores print target data that is updated in each period, for example. Information devices installed in the stores access the server installed in the headquarters and acquire print target data intended for the respective stores. The print target data is then printed by printing apparatuses installed in the respective stores. The print products of the print target data obtained thus are installed in the stores. Examples of the information devices in the stores include personal computers (PCs).

Such a scheme involves skills and knowledge about PC operation. Moreover, the scheme involves PCs installed in the stores in addition to the printing apparatuses. The printing apparatuses therefore desirably acquire the print target data from the server and print the print target data based on user operation on the printing apparatuses. However, printing apparatuses typically have a smaller operation screen than those of PCs. The operation screens of the printing apparatuses are therefore intended for a simple display and desirably for a simple operation method.

The following embodiments demonstrate a case where POP displays are installed (posted) in stores and the print target data is data with which the content of the POP displays is identifiable. However, the print target data may be data with which content to be displayed on print products other than POP displays is identifiable. For example, the print target data may be data with which content to be displayed on materials for a simultaneous company-wide conference is identifiable. For example, the print target data may be data with which content to be displayed on posters installed (posted) in various locations where the same event is held is identifiable.

The embodiments will be described below with reference to the drawings.

A first embodiment will be described. The present embodiment demonstrates a case where a data distribution server installed in the headquarters of chain stores stores print target data, and a printing apparatus installed in each store acquires the print target data from the data distribution server and draws and prints the print target data.

Figure 1:
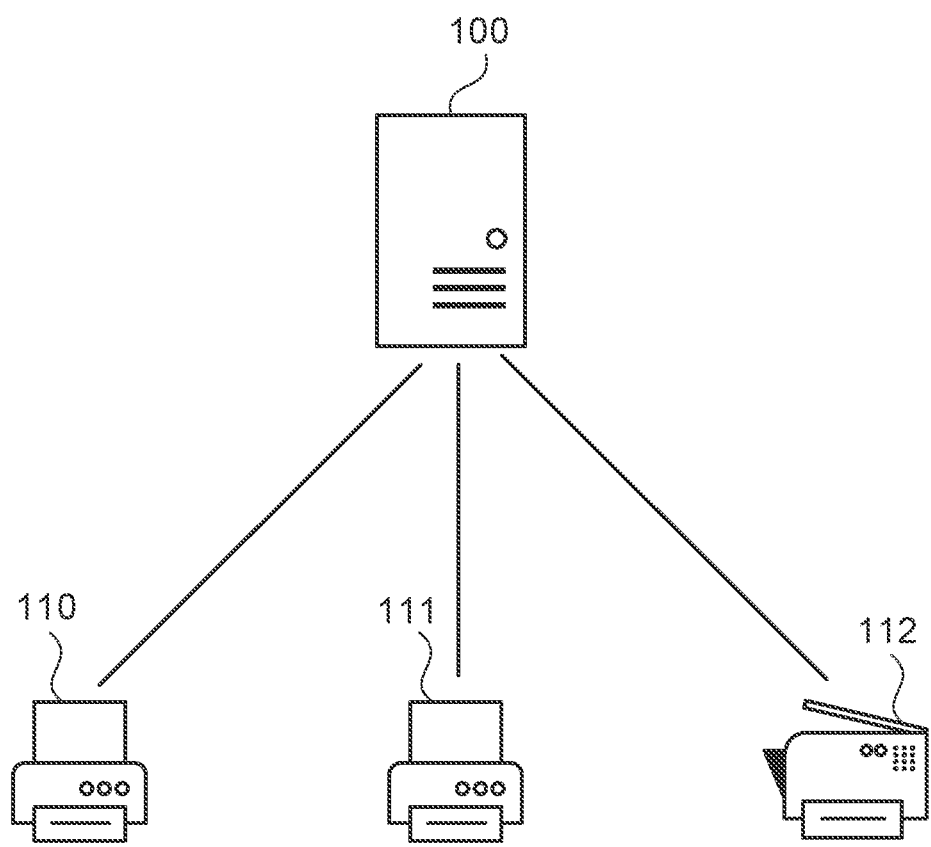
FIG. 1 is a diagram illustrating the configuration of a printing system.

FIG. 1 is a diagram illustrating an example of the configuration of a printing system.

A data distribution server 100 is an example of a server apparatus having a function of transmitting print target data to printing apparatuses. Printing apparatuses 110 to 112 are examples of a printing apparatus having a function of receiving data including print target data from the data distribution server 100 and a function of forming an image based on the print target data and printing the image. The data distribution server 100 stores the print target data. The printing apparatuses 110 to 112 each inquire of the data distribution server 100 whether print target data for the printing apparatus to print is stored in the data distribution server 100. If the print target data for each printing apparatus to print is stored, the printing apparatuses 110 to 112 acquire the print target data from the data distribution server 100. The printing apparatuses 110 to 112 form a print image based on the received print target data, and print the print image.

The data distribution server 100 and the printing apparatuses 110 to 112 are communicably connected to each other via a network. The network may be a wired network or a wireless network. Examples of the network may include the Internet, a local area network (LAN), a wide area network (WAN), and other networks. As described above, the present embodiment demonstrates the case where the print target data is data with which the content to be displayed on POP displays is identifiable. As described above, the present embodiment also demonstrates the case where the data distribution server 100 is installed in the headquarters of the chain stores. The present embodiment also demonstrates a case where the printing apparatuses 110 to 112 are installed in respective different stores. The present embodiment therefore demonstrates a case where the printing apparatuses 110 to 112 each acquire print target data intended for the store where the printing apparatus is installed, and print the print target data. FIG. 1 illustrates an example where the printing system includes three printing apparatuses 110 to 112. However, the number of printing apparatuses included in the printing system is not limited to three. For example, the number of printing apparatuses included in the printing system is the same as the number of printing apparatuses set as transmission destinations of print target data in the data distribution server 100. Since the present embodiment demonstrates the case where the printing apparatuses 110 to 112 are installed in the respective stores as described above, the number of printing apparatuses included in the printing system is two or more. However, the number of printing apparatuses included in the printing system may be one.

Figure 2A:
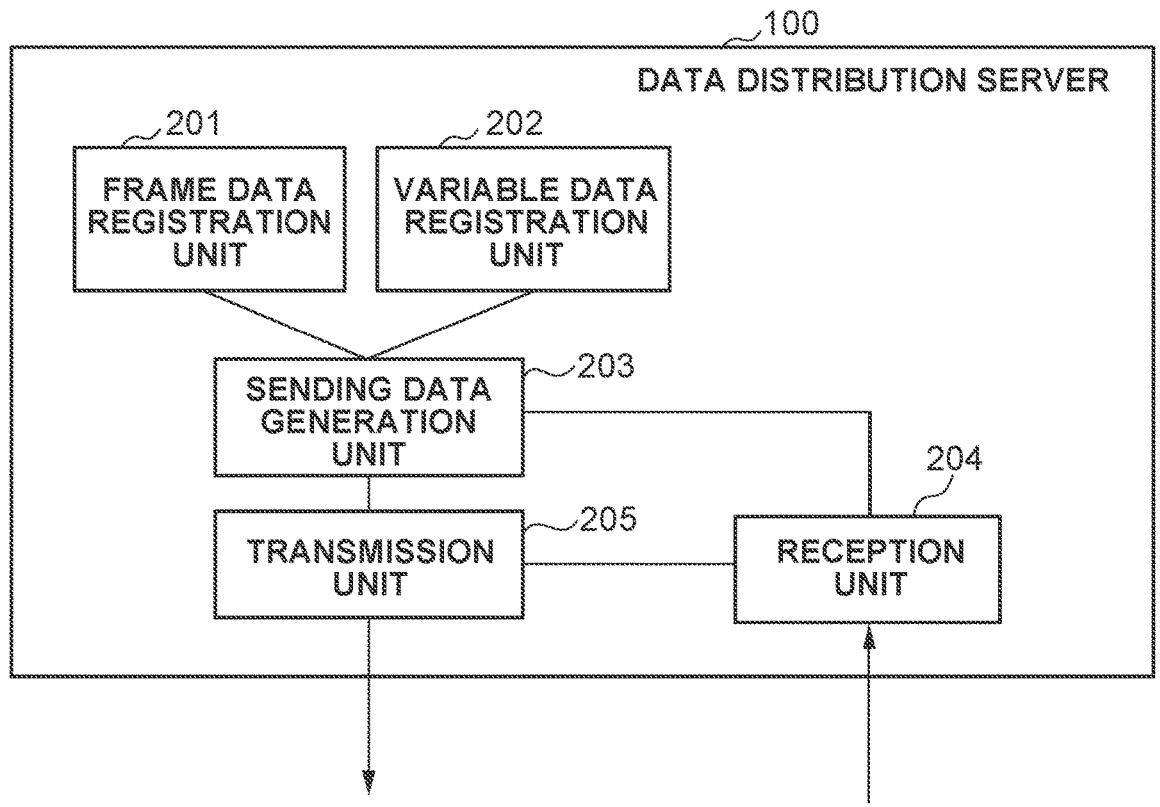
FIGS. 2A and 2B are diagrams illustrating the configurations of a data distribution server.
Figure 2B:
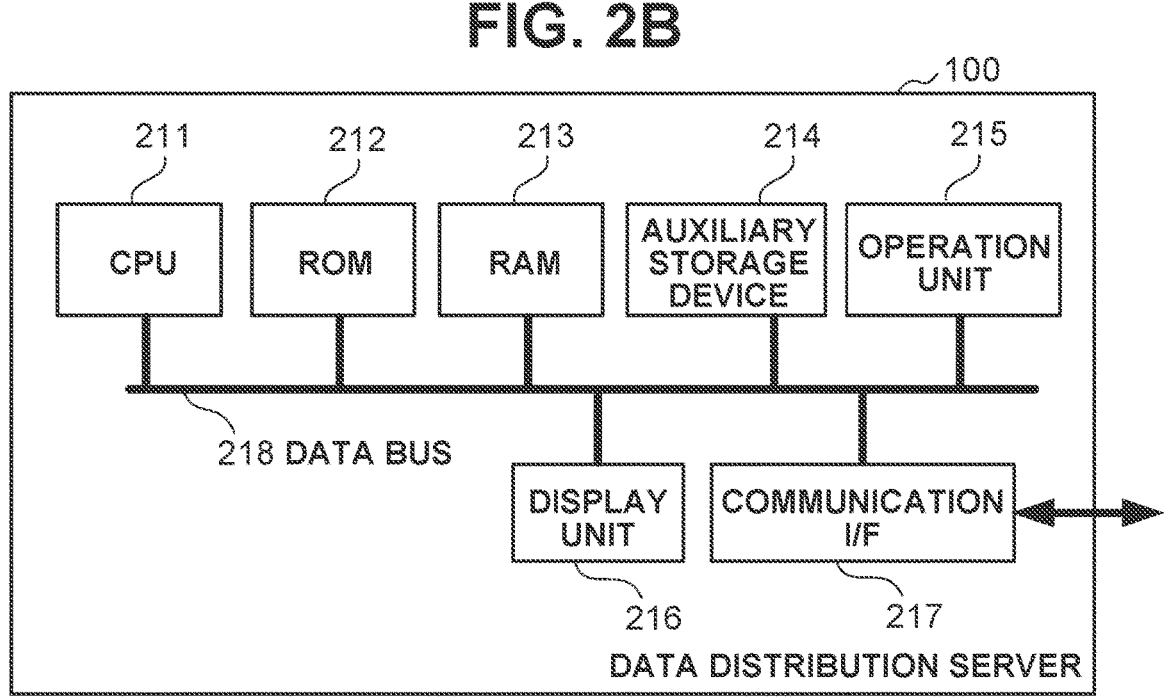

FIGS. 2A and 2B are diagrams illustrating examples of configurations of the data distribution server 100. FIG. 2A is a diagram illustrating an example of a functional configuration of the data distribution server 100. FIG. 2B is a diagram illustrating an example of a hardware configuration of the data distribution server 100.

The example of the hardware configuration of the data distribution server 100 will initially be described with reference to FIG. 2B.

A central processing unit (CPU) 211 implements various functions of the data distribution server 100 by generally controlling the data distribution server 100 using computer programs and various types of data. A read-only memory (ROM) 212 is a nonvolatile memory storing computer programs that do not need to be changed among the computer programs of the CPU 211, such as a control program. A random access memory (RAM) 213 is a volatile memory for temporarily storing computer programs and data for the CPU 211 to process. For example, the RAM 213 temporarily stores data and program control variables for the CPU 211 to process. The RAM 213 is a dynamic RAM (DRAM), for example. An auxiliary storage device 214 is a nonvolatile memory for storing various types of data that can be changed. The auxiliary storage device 214 may store computer programs that can be changed among the computer programs of the CPU 211, such as the control program.

Examples of the auxiliary storage device 214 include a hard disk drive (HDD), a solid-state drive (SSD), and an embedded MultiMediaCard (eMMC). The auxiliary storage device 214 may include a plurality of storage devices (for example, an HDD and an eMMC).

The data distribution server 100 according to the present embodiment demonstrates a case where one CPU 211 performs processes illustrated in flowcharts to be described below by using one memory (RAM 213). However, this is not restrictive. For example, a plurality of CPUs, RAMs, ROMs, and auxiliary storage devices may perform the processes illustrated in the flowcharts to be described below in a cooperative manner. At least part of the processes illustrated in the flowcharts may be performed by dedicated hardware. Examples of the dedicated hardware include an application specific integrated circuit (ASIC) and a field-programmable gate array (FPGA). The processor is not limited to a CPU. For example, the processor may be a graphics processing unit (GPU).

An operation unit 215 accepts a user's operations and outputs various instructions to the CPU 211. For example, the operation unit 215 includes a keyboard, a pointing device (such as a mouse), and a touchscreen. A display unit 216 displays various types of information. For example, the display unit 216 displays a graphical user interface (GUI) for the user to operate the data distribution server 100. The display unit 216 includes a computer display, such as a liquid crystal display, and a light emitting element, such as a light-emitting diode (LED), for example. A communication interface (I/F) 217 is an OF through which the data distribution server 100 communicates with an external apparatus.

If the data distribution server 100 is connected to an external apparatus in a wired manner, a communication cable is connected to the communication OF 217. If the data distribution server 100 has a function of wirelessly communicating with an external apparatus, the communication I/F 217 includes an antenna. A data bus 218 connects the components of the data distribution server 100. The components of the data distribution server 100 exchange information via the data bus 218.

Next, the example of the functional configuration of the data distribution server 100 will be described with reference to FIG. 2A.

The present embodiment demonstrates a case where the content to be displayed on POP displays identifiable with frame image data 400a to 400c and variable data 410a to 410d illustrated in FIG. 4. Here, an example will be described of the functional configuration of the data distribution server 100 in a case where POP displays are generated using the frame image data 400a to 400c, and the variable data 410a to 410d. A detailed example of a data configuration of the frame image data 400a to 400c and the variable data 410a to 410d will be described below with reference to FIG. 4.

A frame data registration unit 201 registers the frame image data 400a to 400c.

The frame image data 400a to 400c is data on design images of an entire print image. The function of the frame data registration unit 201 is implemented, for example, by the CPU 211 performing processing that includes storing the frame image data 400a to 400c into the auxiliary storage device 214.

A variable data registration unit 202 registers the variable data 410a to 410d that is product data stored in the form of text data. For example, the variable data 410a to 410d includes information, such as a product name, a price, and a comment. The function of the variable data registration unit 202 is implemented, for example, by the CPU 211 performing processing that includes storing the variable data 410a to 410d into the auxiliary storage device 214.

A sending data generation unit 203 determines a combination of the frame image data 400a to 400c and the variable data 410a to 410d to constitute a print product (POP display) intended for each store based on the print product, and generates print image data 420. The function of the sending data generation unit 203 is implemented, for example, by the CPU 211 performing processing that includes generating the print image data 420 and temporarily storing the print image data 420 in the RAM 213.

A reception unit 204 receives transmission requests for the print image data 420 from the printing apparatuses 110 to 112 installed in the respective stores. When a transmission request for the print image data 420 is received, the sending data generation unit 203 generates print image data 420 for constituting a print product (POP display) intended for the store where the printing apparatus 110, 111, or 112 issuing the transmission request is installed. A transmission unit 205 transmits the print image data 420 to one of the printing apparatuses 110 to 112 from which the transmission request is issued. The function of the reception unit 204 is implemented, for example, by the communication OF 217 performing processing that includes receiving various types of data including a transmission request for the print image data 420. The function of the transmission unit 205 is implemented, for example, by the communication OF 217 performing processing that includes transmitting various types of data including the print image data 420.

Figure 3:
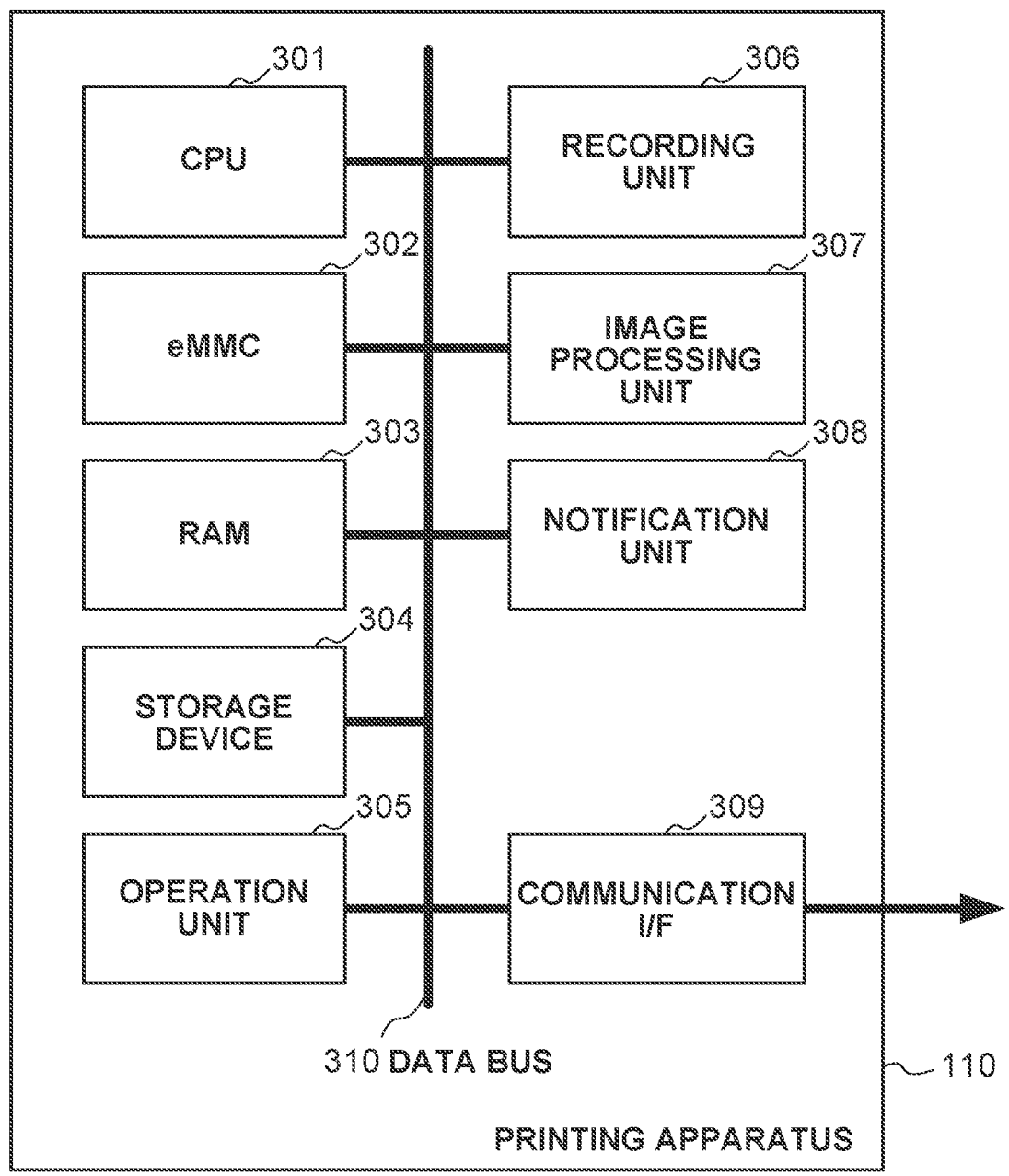
FIG. 3 is a diagram illustrating the configuration of a printing apparatus.

FIG. 3 is a diagram illustrating an example of the hardware configuration of the printing apparatuses 110 to 112. The printing apparatuses 110 to 112 can be implemented by the same configuration. FIG. 3 therefore illustrates an example of the hardware configuration of the printing apparatus 110. Further, the printing apparatuses 110 to 112 do not need to have the same configuration as long as the function of communicating with the data distribution server 100 and the function of forming an image based on data including the print target data transmitted from the data distribution server 100 on a medium to be recorded can be implemented. The present embodiment demonstrates a case where the medium to be recorded is a recording sheet.

A CPU 301 implements various functions of the printing apparatus 110 by generally controlling the printing apparatus 110 using computer programs and various types of data. An eMMC 302 includes a flash memory. The eMMC 302 is a nonvolatile memory storing computer programs, such as a control program of the CPU 301. The eMMC 302 can store data other than computer programs. A RAM 303 is a volatile memory for temporarily storing computer programs and data for the CPU 301 to process. For example, the RAM 303 temporarily stores image data and program control variables for the CPU 301 to process. The RAM 303 is a DRAM, for example.

A storage device 304 is a nonvolatile memory for storing data, such as image data. For example, the storage device 304 includes at least either an HDD or an SSD. The present embodiment demonstrates a case where the print image data 420 is stored in the storage device 304. FIG. 3 illustrates an example where the printing apparatus 110 includes the eMMC 302 and the storage device 304. However, this is not restrictive. For example, the printing apparatus 110 can include either the eMMC 302 or the storage device 304 alone. The printing apparatus 110 can include a ROM.

An operation unit 305 accepts a user's operations and outputs various instructions to the CPU 301. For example, the operation unit 305 includes a switch, a button, and a touchscreen. The present embodiment demonstrates a case where the operation unit 305 includes a computer display, such as a liquid crystal display, and a touchscreen is disposed on the computer display.

A recording unit 306 is a device for printing image data on a recording sheet. The recording unit 306 includes a printer engine. The recording unit 306 applies toner to a recording sheet, and fixes the toner to the recording sheet by pressing the recording sheet in a heated fixing unit. An image processing unit 307 includes a circuit for performing various types of image processing. For example, the image processing unit 307 combines data to be printed, draws the data, and performs encoding processing and decoding processing on the resulting binary image data. In drawing the data, the image processing unit 307 can adjust image color using a color profile.

A notification unit 308 is a device for issuing a notification to the user. For example, the notification unit 308 include at least either an LED or a buzzer. A communication OF 309 is an OF through which the printing apparatus 110 communicates with an external apparatus. If the printing apparatus 110 is connected to an external apparatus in a wired manner, a communication cable is connected to the communication OF 309. If the printing apparatus 110 has a function of wirelessly communicating with an external apparatus, the communication OF 309 includes an antenna. A data bus 310 connects the components of the printing apparatus 110. The components of the printing apparatus 110 exchange information via the data bus 310.

The present embodiment demonstrates a case where the printing apparatuses 110 to 112 include a hardware configuration for implementing multifunction peripheral (MFP) functions aside from the hardware configuration illustrated in FIG. 3. The MFP functions include functions for facsimile (FAX), copying, and email transmission and reception.

Next, an example of a configuration of the print image data 420 will be described with reference to FIG. 4.

For example, the print image data 420 is structured by using one of the pieces of frame image data 400a to 400c and one of the pieces of variable data 410a to 410d.

The frame image data 400a to 400c is image data to be used as print image templates. For example, the frame image data 400a to 400c is image data used in common for POP displays installed in the stores. Image data for displaying the frames used in such POP displays is used as the frame image data 400a to 400c.

The variable data 410a to 410d includes text data, such as a product name, a price, and a comment, among the data used in the POP displays. FIG. 4 illustrates an example where the products to be displayed on the POP displays are vegetables. The names, or product names, of the vegetables and the prices and comments on the respective vegetables are used as text data. A comment is information for describing the features of the product, for example. Of the pieces of data included in the variable data 410a to 410d, the product name, price, and comment are data to be displayed on a POP display. Such pieces of data are changed depending on the store and the product, for example.

Of the pieces of data included in the variable data 410a to 410d, a period of validity is data that is not to be displayed on a POP display. The periods of validity are those of the pieces of variable data 410a to 410d (product names, prices, and comments). For example, a period of validity corresponds to a period for which a POP display displaying the product name, price, and comment stored in the same record (row) as the period of validity is installed in the store. In this sense, the period of validity serves as a parameter indicating that the POP display is desirably printed, for example, before the start time of the campaign period.

The print image data 420 is structured, for example, by combining one of the pieces of frame image data 400a to 400c with one of the pieces of variable data 410a to 410d, for example. The image of the print image data 420 is actually drawn by the printing apparatuses 110 to 112.

In the present embodiment, to print POP displays by the printing system, the data distribution server 100 initially registers the data for constituting the print image data 420. The present embodiment demonstrates a case where the frame image data 400a to 400c and the variable data 410a to 410d are registered as the data for constituting the print image data 420.

Figure 5A:
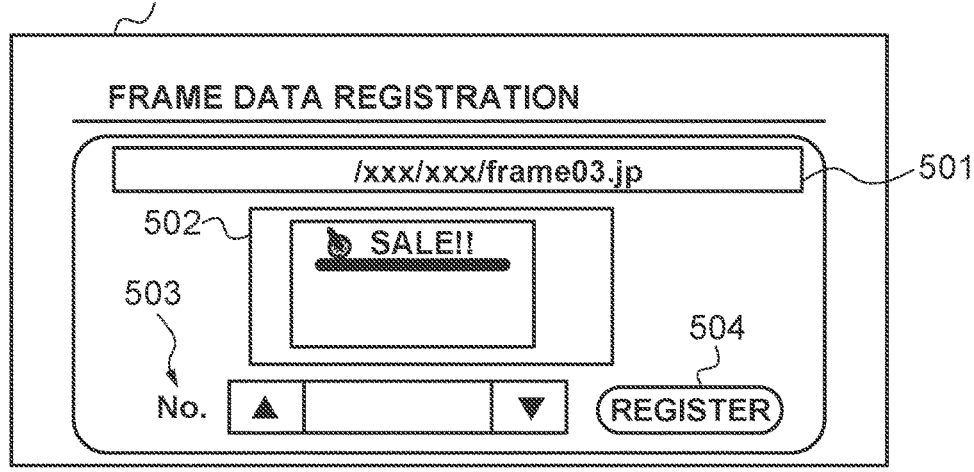
FIGS. 5A to 5C are diagrams illustrating a graphical user interface (GUI) displayed on the data distribution server in registering print image data.
Figure 5B:
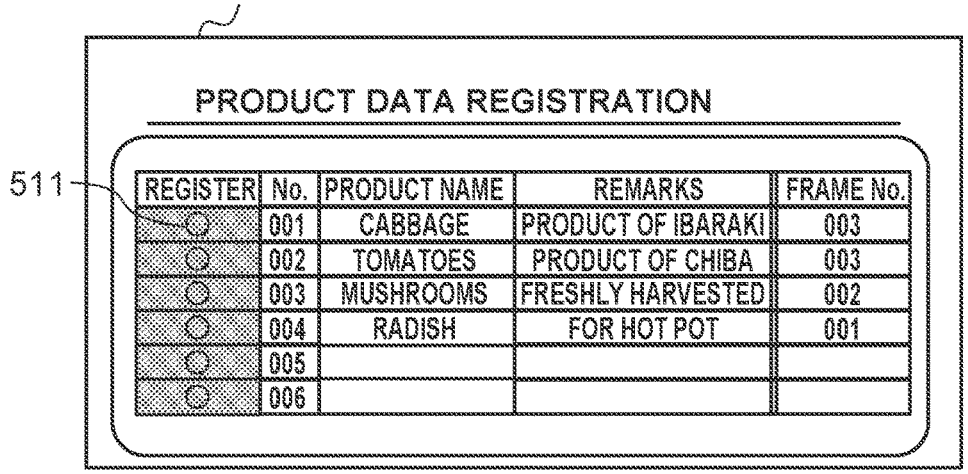
Figure 5C:
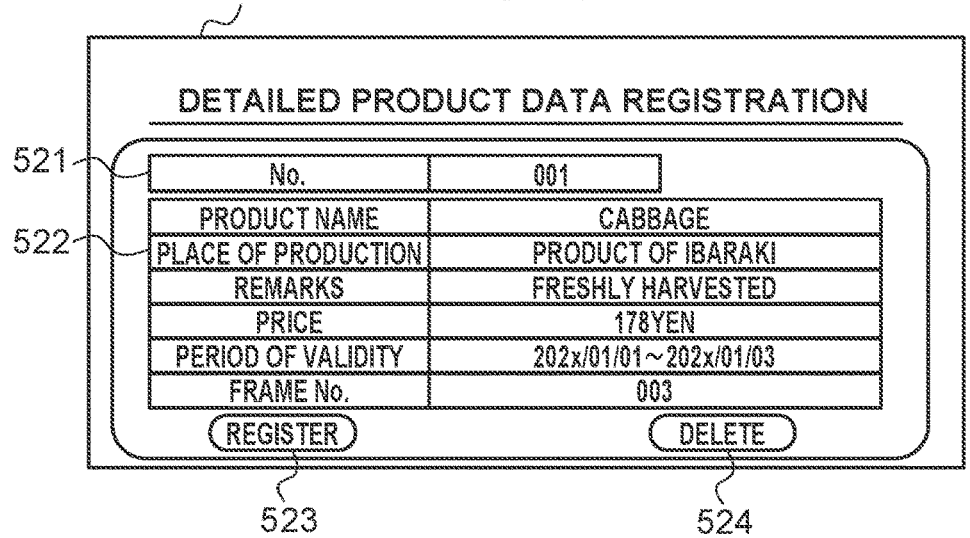

FIGS. 5A to 5C are diagrams illustrating examples of a GUI displayed on the data distribution server 100 (display unit 216) in registering the data for constituting the print image data 420.

As described above, in the present embodiment, the print image data 420 includes one of the pieces of frame image data 400a to 400c and one of the pieces of variable data 410a to 410d.

An example of a method for registering the frame image data 400a to 400c in the data distribution server 100 will initially be described.

The user operates the operation unit 215 to instruct the data distribution server 100 to display a registration screen for the frame image data 400a to 400c. Based on the instruction, the frame data registration unit 210 displays a frame image registration screen on the display unit 216.

FIG. 5A is a diagram illustrating an example of a frame image registration screen 500. The frame image registration screen 500 is a screen for registering the frame image data 400a to 400c. The user operates the operation unit 215 to input a filename of the frame image data 400a, 400b, or 400c to be registered into a filename input field 501. The GUI part constituting the filename input field 501 is not limited in particular. For example, the GUI part constituting the filename input field 501 may be a text box, a combo box, or other GUI parts. When the filename of the frame image data 400a, 400b, or 400c to be registered is input to the filename input field 501, the frame data registration unit 201 displays a preview of frame image data included in the file having the filename in a display area 502.

The user operates the operation unit 215 to input the registration number of the frame image data 400a, 400b, or 400c to be registered into a number input field 503. The GUI part constituting the number input field 503 is not limited in particular. For example, the GUI part constituting the number input field 503 may be a spin box, a list box, a text box, a combo box, or other GUI parts. After the inputting the filename and the registration number into the filename input field 501 and the number input field 503 as described above, respectively, the user operates the operation unit 215 to press a registration button 504.

If the registration button 504 is pressed, the frame data registration unit 201 stores the filename of the frame image data 400a, 400b, or 400c input to the filename input field 501 and the registration number input to the number input field 503 in association with each other. The present embodiment demonstrates a case where the frame image data 400a to 400c is registered in such a manner. The frame data registration unit 201 may delete or update the frame image data 400a to 400c.

Next, an example of a method for registering the variable data 410a to 410d in the data distribution server 100 will be described.

The user operates the operation unit 215 to instruct the data distribution server 100 to display a product data registration screen. Based on the instruction, the variable data registration unit 202 displays the product data registration screen on the display unit 216.

FIG. 5B is a diagram illustrating an example of a product data registration screen 510. The product data registration screen 510 is a screen for registering the summary of the variable data 410a to 410d and the frame image data 400a to 400c to be combined with the variable data 410a to 410d. In FIG. 5B, product numbers are input to and displayed in a number column. Product names are input to and displayed in a product name column. All or part of the content of the foregoing comments is input to and displayed in a remarks column, for example. The registration numbers of the frame image data 400a to 400c (registration numbers input in the registration input field 503) are input to and displayed in a frame No. column. The GUI parts constituting these columns are not limited in particular. For example, the GUI parts constituting the columns may be text boxes, combo boxes, or other GUI parts.

The user operates the operation unit 215 to press one of registration buttons 511, whereby one of the pieces of variable data 410a to 410d is selected. In FIG. 5B, for the sake of illustration, only one of the registration buttons 511 is denoted by the reference numeral (511). The GUI parts for selecting one of the pieces of variable data 410a to 410d may be other than the registration buttons 511 (radio buttons).

When a registration button 511 is pressed, the variable data registration unit 202 displays a detailed product data registration screen for registering variable data corresponding to the pressed registration button 511 among the variable data 410a to 410d on the display unit 216. The frame image data to be combined with this variable data is the frame image data corresponding to the registration number indicated by frame No. included in the variable data. Frame No. thus identifies the frame image data to be combined with the variable data.

In generating new variable data, the user operates the operation unit 215 to press a registration button 511 in an empty row of the list on the product data registration screen 510. When a registration button 511 is pressed, a detailed product data registration screen 520 to be described below appears. The user operates the operation unit 215 to input information about the product name, remarks, and frame No. of the new variable data into the corresponding empty fields. The variable data registration unit 202 generates the new variable data based on the information thus input, and stores the generated new variable data.

FIG. 5B illustrates an example where one of the pieces of variable data 410a to 410d is selected. However, this is not restrictive. A plurality of pieces of variable data may be selected. In this case, the plurality of pieces of variable data thus selected are desirably ones with the same frame No. (the registration number of the frame image data).

As described above, when a registration button 511 is pressed, the variable data registration unit 202 displays a detailed product data registration screen 520 for the product number corresponding to the registration button 511 on the display unit 216.

FIG. 5C is a diagram illustrating an example of the detailed product data registration screen 520. The detailed product data registration screen 520 is a screen for registering details of the variable data corresponding to the pressed registration button 511 and frame image data to be combined with the variable data.

In FIG. 5C, a number display field 521 displays the product number input in the number field selected by the registration button 511. Pieces of data to be included in the variable data on the product of the product number are input to a detail input field 522. For ease of description, the present embodiment demonstrates a case where the product numbers and the pieces of print image data 420 correspond on a one-to-one basis, and the pieces of print image data 420 are assigned respective different product numbers.

The user operates the operation unit 215 to press the display area of each item in the detail input field 522. The variable data registration unit 202 then makes the item input field corresponding to the item capable of accepting input. For example, if the item input field is a text box, the variable data registration unit 202 makes it possible for text to be input to the text box.

The user operates the operation unit 215 to input information corresponding to the item into the item input field.

The period of validity illustrated in FIG. 5C refers to the period of validity described with reference to FIG. 4. The GUI parts constituting the item input fields are not limited to text boxes.

When displaying the detailed product data registration screen 520, the variable data registration unit 202 may display the information input to the product name, remarks, and frame No. fields selected with the registration button 511 in the product name, remarks, and frame No. fields, respectively. The product data registration screen 510 illustrated in FIG. 5B includes a remarks column without a place of production column. The detailed product data registration screen 520 illustrated in FIG. 5C includes both a remarks field and a place of production field. When a place of production is displayed in the remarks field of the detailed product data registration screen 520 illustrated in FIG. 5C, the user can operate the operation unit 215 to delete the place of production input in the remarks field and input the place of production into the place of production field. The variable data registration unit 202 may display the place of production not in the remarks field of the detailed product data registration screen 520 but in the place of product field at the timing when displaying the detailed product data registration screen 520 illustrated in FIG. 5C.

If displaying a detailed product data registration screen 520 corresponding to registered variable data, the variable data registration unit 202 displays the registered content on the detailed product data registration screen 520. For example, if the user desires to update the content of the variable data to be displayed on a POP display of the product of a certain product number, the user presses the registration button 511 corresponding to the product number. The variable data registration unit 202 then displays the registered content on the detailed product data registration screen 520. The user operates the operation unit 215 to update the content of each item input field on the detailed product data registration screen 520.

The user operates the operation unit 215 to press the registration button 523. The variable data registration unit 202 then stores the information input to the detailed product data registration screen 520 as data constituting a piece of variable data. If the user operates the operation unit 215 to press a delete button 524, the variable data registration unit 202 deletes the variable data on the product of the product number displayed on the detailed product data registration screen 520 (number display field 521).

The variable data registration unit 202 performs registration of variable data in such a manner, on each of the pieces of variable data 410*a* to 410*d* to be included in POP displays for the printing apparatuses 110 to 112 installed in the respective stores to print, for example.

The frame image data 400*a* to 400*c* and the variable data 410*a* to 410*d* are thus registered and stored in the data distribution server 100.

In the present embodiment, if a transmission request for print image data 420 is issued from each of the printing apparatuses 110 to 112, the sending data generation unit 203 generates the print image data 420. The present embodiment demonstrates a case where the data distribution server 100 stores print configuration information and status information as information for identifying the print image data 420 corresponding to the transmission request.

FIGS. 6A and 6B are diagrams illustrating examples of print configuration information 600 and status information 610.

The print configuration information 600 illustrated in FIG. 6A is information for identifying each piece of print image data 420. For example, the print configuration information 600 is stored in the data distribution server 100 in the form of a list illustrated in FIG. 6A. A record (row) of the print configuration information 600 stores information for identifying frame image data and variable data to constitute a piece of print image data 420. In FIG. 6A, a number refers to the product number (number displayed in the number display field 521). As described above, the present embodiment demonstrates the case where the pieces of print image data 420 are assigned respective different product numbers. The print configuration information 600 is structured by using information registered from the detailed product data registration screen 520.

In FIG. 6B, the status information 610 is stored by product number (by piece of print image data 420). In FIG. 6B, a number refers to the product number. The print configuration information 600 illustrated in FIG. 6A and the status information 610 illustrated in FIG. 6B are associated with each other by the product numbers.

FIG. 6B illustrates an example where the status information 610 includes the following information.

In FIG. 6B, a number refers to the product number (number displayed in the number display field 521). As described above, the present embodiment demonstrates the case where the pieces of print image data 420 are assigned respective different product numbers. In FIG. 6B, a store name refers to the names of the stores where the printing apparatuses 110 to 112 are installed. FIG. 1 illustrates the example where the number of printing apparatuses 110 to 112 included in the printing system is three, but the number of printing apparatuses included in the printing system is not limited to three as described above. FIG. 6B illustrates an example where the number of stores is six, and the number of printing apparatuses is thus six or more.

In FIG. 6B, a target indicates whether the print image data 420 is to be printed at each store. For example, if a store does not deal in a product of a certain product number, the image based on the print image data 420 corresponding to the product number does not need to be printed. The print image data 420 is therefore not a print target at the store. FIG. 6B illustrates an example where a white circle (o) is registered in the target field if the print image data 420 is a print target, and a cross mark (x) is registered in the target field if the print image data 420 is not a print target.

In FIG. 6B, the state indicates whether the image based on the print image data 420 is printed at each store where the print image data 420 is a print target. FIG. 6B illustrates an example where "not printed" is registered in the state field if the print image data 420 has not been printed yet. FIG. 6B also illustrates an example where "printed" is registered in the state field if the print image data 420 has been printed. FIG. 6B also illustrates an example where "updated" is registered in the state field if the print image data 420 has been printed, the content of the print image data 420 is then updated, and the updated print image data 420 has not been printed yet. If the print image data 420 is not a print target, "-" is registered in the state field of the corresponding product number.

As described above, the status information 610 illustrated in FIG. 6B is information where the information about the "state" and "target" fields at each store is set by piece of print image data 420 (by product number).

In registering the status information 610, the user operates the operation unit 215 to instruct the data distribution server 100 to display a status information registration screen. Based on the instruction, the data distribution server 100 displays the status information registration screen on the display unit 216. The status information registration screen is a GUI allowing text input of information about the numbers, store names, targets, and states in FIG. 6B, for example. The user operates the operation unit 215 to input the information about each item on the status information registration screen. The data distribution server 100 stores the information input to the status information registration screen as the status information 610.

FIGS. 6A to 6B show the following: The product of number "003" has a product name "mushroom", the place of production is "Tochigi", the product POP display uses frame image data of frame No. "002", and the price is "249 yen". The POP display of the product of number "003" is to be printed by the printing apparatuses installed in xxx store 1, yyy store 1, and yyy store 2. Of these, xxx store 1 has once printed the product POP display, but the product data has been updated after the printing. yyy store 1 has printed the latest product POP display, and yyy store 2 has not printed the POP display yet.

Next, an example of setting of the printing apparatuses 110 to 112 will be described. The present embodiment demonstrates a case where the settings and the setting methods for the printing apparatuses 110 to 112 are the same. Here, the examples of the settings of the printing apparatuses 110 to 112 will therefore be described by using the printing apparatus 110 as an example.

FIGS. 7A to 7D are diagrams illustrating examples of a GUI displayed on the printing apparatus 110 (computer display included in the operation unit 305) in making print settings.

FIG. 7A is a diagram illustrating an example of a server registration screen 700. The server registration screen 700 is a screen for registering the data distribution server 100 that transmits the print image data 420 to the printing apparatus 110. For example, the server registration screen 700 is displayed based on an operation of a setting menu (GUI) displayed on the printing apparatus 110.

In FIG. 7A, a network address of the data distribution server 100 is input to a network address input field 701. For example, a Uniform Resource Locator (URL) of the data distribution server 100 is input to the network address input field 701. Information corresponding to the store where the printing apparatus 110 is installed is input to a store information input field 702. FIG. 7A illustrates an example where a store identifier (ID) that is identification information about the store where the printing apparatus 110 is installed and a login ID and a password for accessing the data distribution server 100 are input to the store information input field 702. Information indicating whether to print the print image data 420 is input to a POP print function setting field 703 by pressing a POP print button 732 to be described below. FIG. 7A illustrates an example where "enabled" is input to the POP print function setting field 703 if the print image data 420 is printed by pressing the POP print button 732, and "disabled" is input to the POP print function setting field 703 if not. If "disabled" is input to the POP print function setting field 703, the POP print button 732 to be described below is not displayed. In the following description, the printing of the print image data 420 performed by pressing the POP print button 732 will be referred to as POP printing when appropriate.

The GUI parts constituting the network address input field 701, the store information input field 702, and the POP print function setting field 703 are not limited in particular. For example, the GUI parts constituting these fields may be text boxes, combo boxes, or other GUI parts.

The user operates the operation unit 305 to input information corresponding to the network address input field 701, the store information input field 702, and the POP print function setting field 703 to the respective fields and then press a registration button 704. When the registration button 704 is pressed, the information input to these fields is stored into the printing apparatus 110.

Next, an example of setting of the print image data 420 for the printing apparatus 110 to acquire during POP printing will be described. FIG. 7B is a diagram illustrating an example of a POP print setting screen 710. The POP print setting screen 710 is a screen for setting which state of print image data 420 for the printing apparatus 110 to acquire during POP printing. For example, the POP print setting screen 710 is displayed based on an operation of the setting menu (GUI) displayed on the printing apparatus 110.

In FIG. 7B, information about the state of print image data 420 to be POP printed is set in a status setting field 711. Here, a case where the state corresponds to information registered in the state fields of the status information 610 illustrated in FIG. 6B will be described. FIG. 7B illustrates an example where the options include to POP print only newly added print image data 420. The newly added print image data 420 refers to print image data 420 corresponding to a number or numbers (product number[s]) where "not printed" is registered in the state field(s) of the status information 610 illustrated in FIG. 6B. FIG. 7B also illustrates an example where the options include to POP print newly added print image data 420 and updated print image data 420. The updated print image data 420 refers to print image data 420 corresponding to a number or numbers (product number[s]) where "updated" is registered in the state field(s) of the status information 610 illustrated in FIG. 6B. The GUI parts for the selection are not limited in particular. The GUI parts may be radio buttons or other GUI parts.

In FIG. 7B, information about the period of validity of the print image data 420 to be POP printed is set in a period setting field 712. Here, a case will be described where the period of validity corresponds to the information registered in the period of validity field of the print configuration information 600 illustrated in FIG. 6A. FIG. 7B illustrates an example where the options include to POP print all the print image data 420 in the state set in the status setting field 711 regardless of the period of validity. FIG. 7B also illustrates an example where the options include to POP print the print image data 420 in which the current time falls within the period of validity. FIG. 7B also illustrates an example where the options include to POP print the print image data 420 in which the current time falls within a period from n days before the period of validity to the last day of the period of validity. The GUI parts for the selection are not limited in particular.

The GUI parts may be radio buttons or other GUI parts. The value of n in the foregoing "n days before" is input to a number of days input field 713. The GUI part constituting the number of days input field 713 is not limited in particular, and may be a text box, a combo box, or other GUI parts. An expiration date and time (expiration time) may be used instead of the period of validity. In such a case, the current date and time is compared with the expiration date and time.

The user operates the operation unit 305 to make selections in the status stetting field 711 and the period setting field 712 and then press a registration button 714. When the registration button 714 is pressed, the information selected in the fields 711 and 712 is stored into the printing apparatus 110.

Next, an example will be described of setting of a condition for the printing apparatus 110 to issue a notification prompting POP printing. Here, a case will be described where a notification prompting POP printing is issued if the print image data 420 has not been POP printed by the printing apparatus 110 before the timing (for example, date) to perform the POP printing.

FIG. 7C is a diagram illustrating an example of a notification setting screen 720. The notification setting screen 720 is a screen for setting a notification prompting POP printing. For example, the notification setting screen 720 is displayed when the registration button 714 of the POP print setting screen 710 is pressed. The notification setting screen 720 may be displayed based on an operation of the setting menu (GUI) displayed on the printing apparatus 110.

In FIG. 7C, information indicating whether to issue a notification prompting POP printing is input to a notification setting field 721. FIG. 7C illustrates an example where "enabled" is input to the notification setting field 721 in order to issue the notification prompting POP printing, and "disabled" is input to the notification setting field 721 in order not to.

A method for issuing the notification prompting POP printing is set in notification method setting fields 722 and 723.

FIG. 7C illustrates an example where whether to issue the notification prompting POP printing by light emission from the LED included in the notification unit 308 is set in the notification method setting field 722. Specifically, in the example illustrated in FIG. 7C, "enabled" is input to the notification method setting field 722 in order to issue the notification prompting POP printing by the light emission from the LED included in the printing apparatus 110, and "disabled" is input to the notification method setting field 722 in order not to. FIG. 7C also illustrates an example where whether to issue the notification prompting POP printing by sound emission from the buzzer included in the notification unit 308 is set in the notification method setting field 723. Specifically, in the example illustrated in FIG. 7C, "enabled" is input to the notification method setting field 723 in order to issue the notification prompting POP printing by the sound emission from the buzzer, and "disabled" is input to the notification method setting field 723 in order not to. The GUI parts constituting the notification setting field 721 and the notification method setting fields 722 and 723 are not limited in particular. For example, the GUI parts constituting the notification setting field 721 and the notification method setting fields 722 and 723 may be text boxes, combo boxes, or other GUI parts.

The user operates the operation unit 305 to make settings in the notification setting field 721 and the notification method setting fields 722 and 723 and then press an OK button 724. When the OK button 724 is pressed, the information set in the fields 721, 722, and 723 is stored into the printing apparatus 110. The information set in the fields 721, 722, and 723 is also transmitted to the data distribution server 100.

The data distribution server 100 stores the information set in the notification setting field 721 and the notification method setting fields 722 and 723, for example. The data distribution server 100 determines whether to issue a notification prompting POP printing for each of the printing apparatuses 110 to 112 based on the information, the period of validity included in the print configuration information 600, and the states included in the status information 610. Based on the determination result, the data distribution server 100 instructs the printing apparatus 110 to issue a notification prompting POP printing. The printing apparatus 110 (notification initial 308) that has received the instruction issues a notification prompting POP printing based on the settings of the notification method setting fields 722 and 723.

The notification prompting POP printing is not limited to one issued in the case where the print image data 420 has not been printed by the printing apparatus before the timing (for example, date) to perform POP printing. For example, the notification prompting POP printing may be issued when new print image data 420 for the printing apparatuses 110 to 112 to POP print is registered in the data distribution server 100 or when the print image data 420 is updated on the data distribution server 100.

FIG. 7D is a diagram illustrating an example of a home screen 730. The home screen 730 is a screen where the user selects a function to be performed by the printing apparatus 110. If POP printing is set to be performed (enabled) in the POP print function setting field 703 illustrated in FIG. 7A, the home screen 730 displays the POP print button 732. On the other hand, if POP printing is not set to be performed (disabled) in the POP print function setting field 703, the home screen 730 does not display the POP print button 732. FIG. 7D illustrates a case where buttons 731a to 731c to be pressed in performing other functions are displayed on the home screen 730 along with the POP print button 732.

The user operates the operation unit 305 to press the POP print button 732. The printing apparatus 110 issues a transmission request for print image data 420 by transmitting the information set on the server registration screen 700 and the POP print setting screen 710 to the data distribution server 100. The data distribution server 100 identifies print image data 420 satisfying the print condition indicated by the information and transmits the print image data 420 to the printing apparatus 110. The printing apparatus 110 receives the print image data 420 transmitted from the data distribution server 100 and prints the print image data 420. The present embodiment thus demonstrates a case where the print image data 420 is automatically selected and printed by simply pressing the POP print button 732 with the POP printing set to be performed. In the case of performing the POP printing, the user therefore does not individually specify the print image data 420 to be POP printed. The user can thus start to print the print image data 420 intended for the store to which he/she belongs without regard for the individual piece or pieces of print image data 420.

The present embodiment demonstrates a case where print image data 420 for which "printed" is registered in the state field in the status information 610 illustrated in FIG. 6B is not printed by pressing the POP print button 732 even if the print image data 420 is desirably printed again. If the print image data 420 is desirably printed again, the print image data 420 can be printed, for example, by an operation different from the pressing of the POP print button 732. Even in such a case, the print image data 420 not satisfying the condition indicated by the information set in the period setting field 712 is desirably not transmitted from the data distribution server 100. The operation different from the pressing of the POP print button 732 may be an operation on the printing apparatuses 110 to 112 or on an apparatus other than the printing apparatuses 110 to 112.

Figure 8:
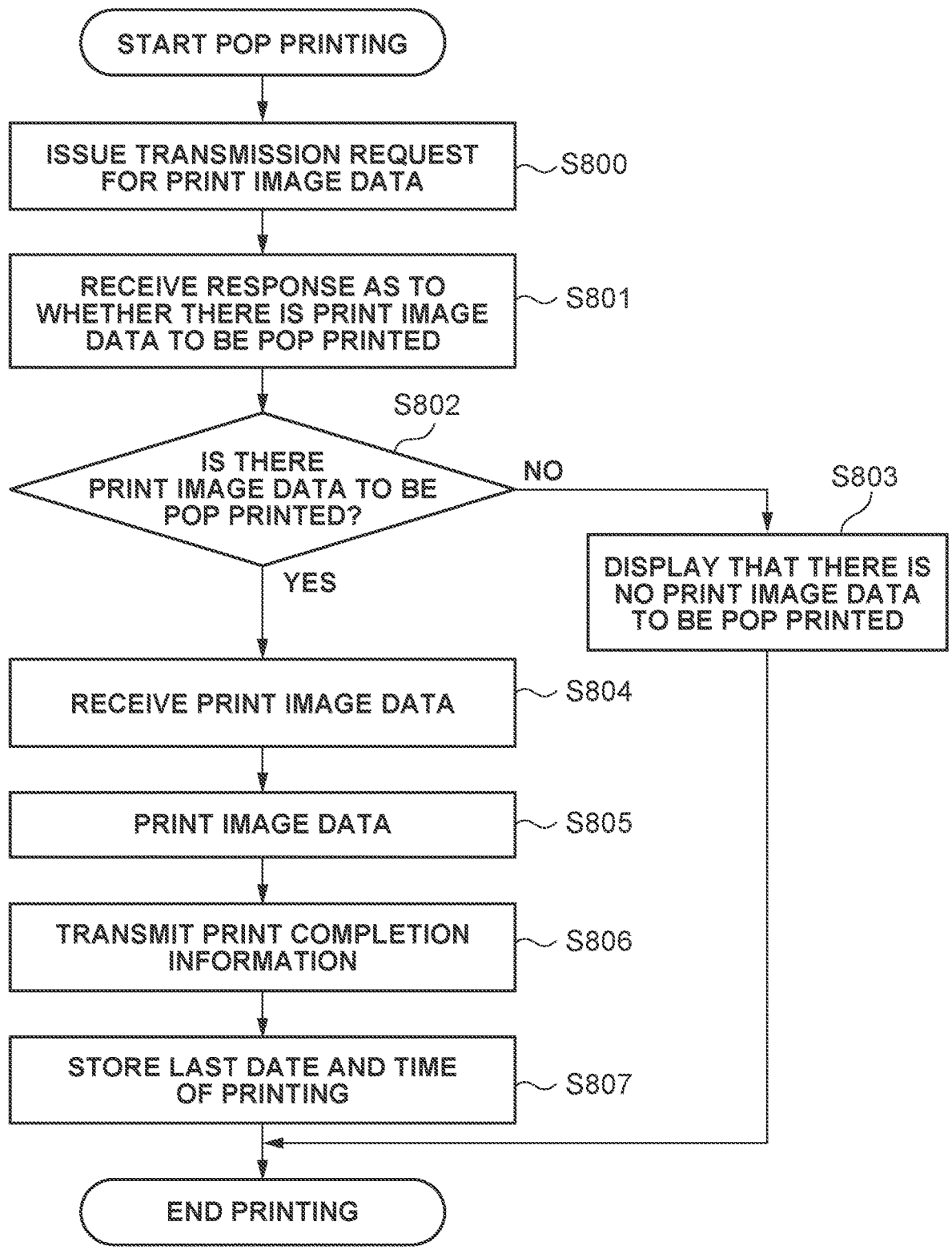
FIG. 8 is a flowchart illustrating an operation of the printing apparatus in performing point of purchase (POP) printing.

FIG. 8 is a flowchart illustrating an example of an operation of the printing apparatuses 110 to 112 in performing POP printing. The present embodiment demonstrates a case where the printing apparatuses 110 to 112 make the same operation in performing POP printing. The example of the operation of the printing apparatuses 110 to 112 in performing POP printing will therefore be described by using the printing apparatus 110 as an example. For example, the processing in the flowchart of FIG. 8 is performed by the CPU 301 running a computer program related to POP printing, using the RAM 303.

When the user presses the POP print button 732, the POP printing is started. In step S800, the printing apparatus 110 initially issues a transmission request for print image data 420 by transmitting the information set on the server registration screen 700 and the POP print setting screen 710 to the data distribution server 100.

In step S801, the printing apparatus 110 receives a response as to whether there is print image data 420 to be POP printed by the printing apparatus 110 from the data distribution server 100. In step S802, the printing apparatus 110 determines whether there is print image data 420 to be POP printed by the printing apparatus 110 based on the response received in step S801.

If, as a result of the determination, there is print image data 420 to be POP printed by the printing apparatus 110 (YES in step S802), the processing proceeds to step S804. In step S804, the printing apparatus 110 receives the print image data 420 to be POP printed by the printing apparatus 110 from the data distribution server 100. In step S805, the printing apparatus 110 performs drawing processing on the print image data 420 using the image processing unit 307, and prints the resulting image(s) on a recording sheet or sheets using the recording unit 306.

In step S806, the printing apparatus 110 transmits print completion information indicating completion of the printing of the print image data 420 received in step S804 to the data distribution server 100. For the sake of simple description, suppose that the print image data 420 received in step S804 is normally printed.

In step S807, the printing apparatus 110 stores the date and time when the printing is last performed in step S805 into, e.g., the RAM 303 as the last date and time of printing. After the end of the processing of step S807, the processing of the flowchart of FIG. 8 ends. Further, in step S807, the printing apparatus 110 also stores identification information about the user who has logged in when the instruction to perform printing is given in step S805. The stored identification information about the user is used to display the last print user on a printed notification screen 900 illustrated in FIG. 9 to be described below. If the printing apparatus 110 does not provide a user login function or the printing is instructed with no user who has logged in, no user identification information is stored. If identification information corresponding to the last print user is not stored, the last print user field in FIG. 9 is empty.

In step S802, if the printing apparatus 110 determines that there is no print image data 420 to be POP printed by the printing apparatus 110 (NO in step S802), the processing proceeds to step S803. In step S803, the printing apparatus 110 displays that there is no print image data 420 to be POP printed on the operation unit 305.

Figure 9:
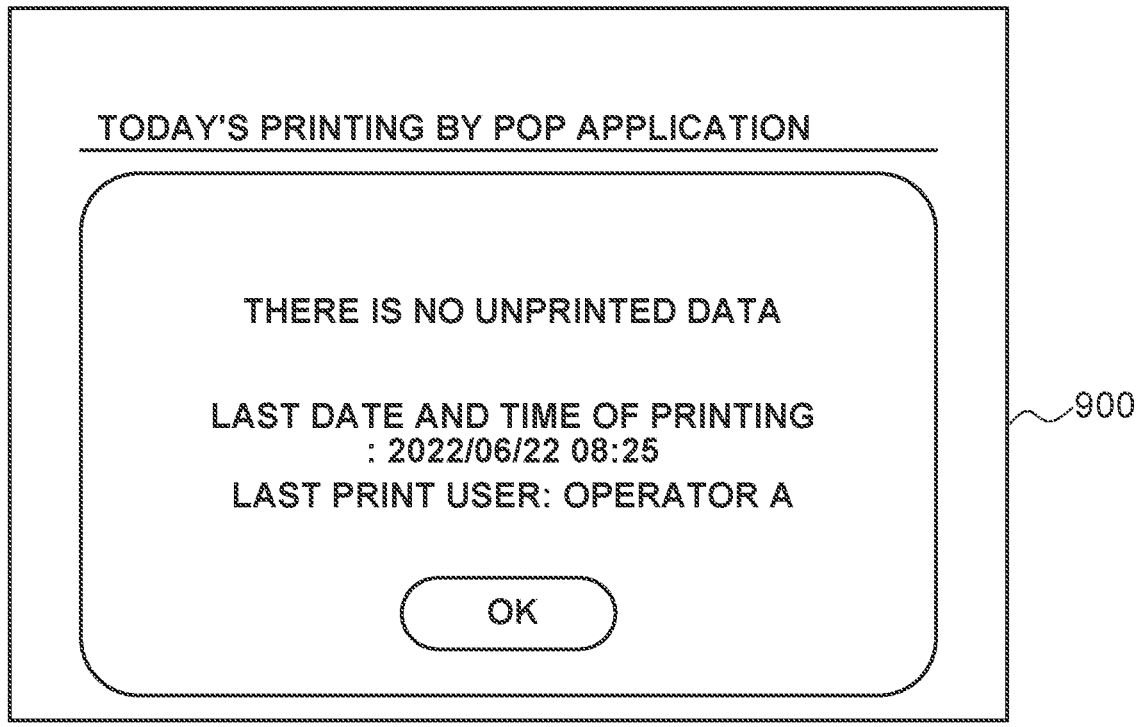
FIG. 9 is a diagram illustrating information displayed in step S803.

FIG. 9 is a diagram illustrating an example of the information displayed in step S803. As illustrated in FIG. 9, the present embodiment demonstrates a case where the printed notification screen 900 displays the following information in step S803. The printed notification screen 900 displays information indicating that there is no print image data 420 to be POP printed at the execution timing of this flowchart. The printed notification screen 900 also displays information indicating the last date and time of printing stored in step S807. The printed notification screen 900 also displays information indicating the user instructing the POP printing at the last date and time of printing.

If the POP print button 732 is pressed and the POP printing is not performed, the user can thereby be notified when and by whose instruction the print image data 420 is last printed by the printing apparatus 110. The user can thus find out whether the reason why the POP printing is not performed is the actual absence of print image data 402 to be POP printed or because the POP printing has already been performed by another user's instruction. After the end of the processing of step S803, the processing of the flowchart of FIG. 8 ends.

Figure 10:
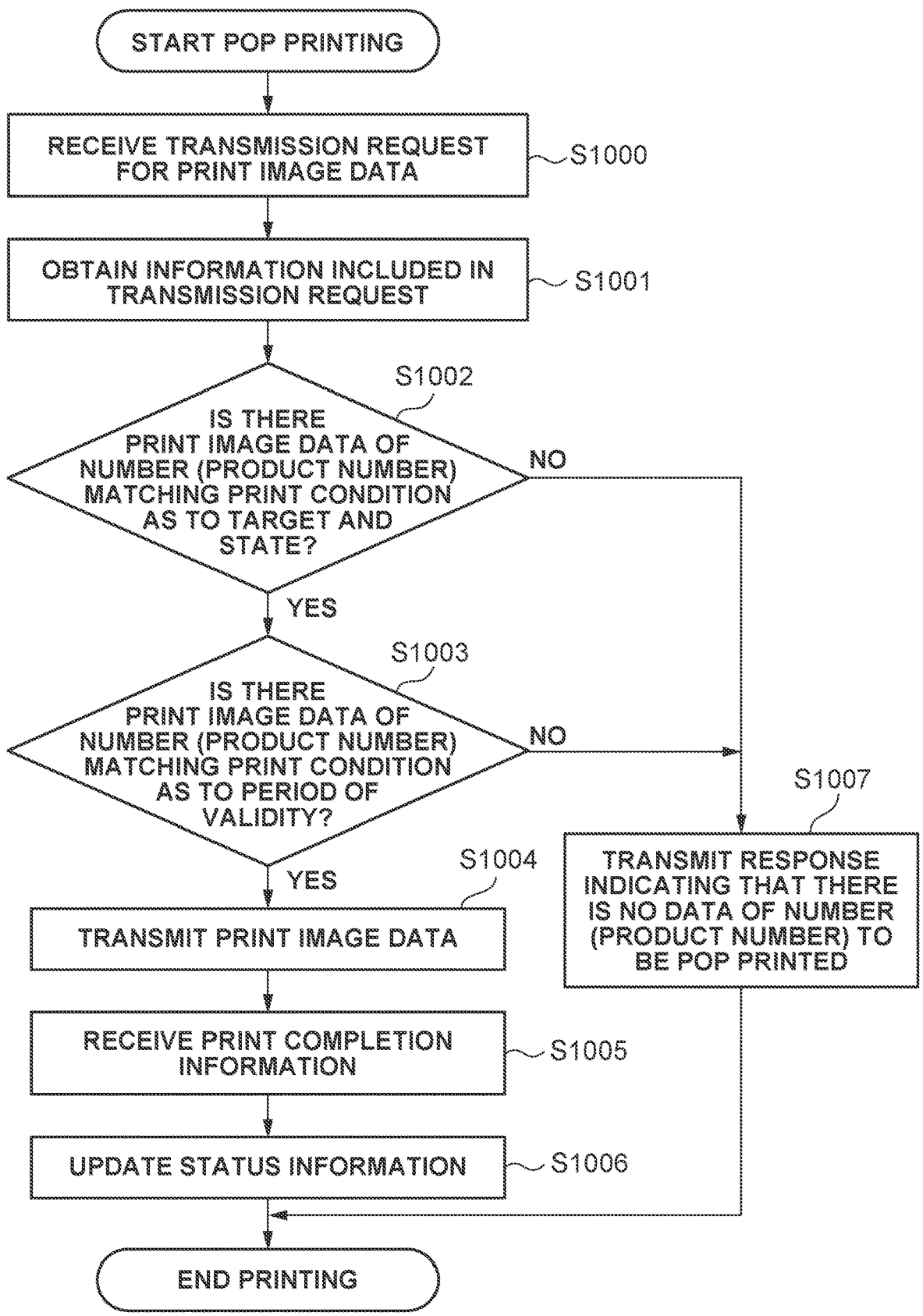
FIG. 10 is a flowchart illustrating an operation of the data distribution server during POP printing.

FIG. 10 is a flowchart illustrating an example of an operation of the data distribution server 100 when an instruction to start POP printing is given. The present embodiment demonstrates a case where the operation of the data distribution server 100 when an instruction to start POP printing is given is the same regardless of which printing apparatus is, the printing apparatus 110, 111, or 112. The example of the operation of the data distribution server 100 when an instruction to start POP printing is given will be described by using the printing apparatus 110 as an example. For example, the processing in the flowchart of FIG. 10 is performed by the CPU 211 running a computer program related to the transmission of the print image data 420, using the RAM 213.

In step S1000, the reception unit 204 initially receives a transmission request for print image data 420 from the printing apparatus 110. The transmission request for print image data 420 is issued in step S800 of FIG. 8.

In step S1001, the sending data generation unit 203 acquires the information set on the server registration screen 700 and the POP print setting screen 710, included in the transmission request for print image data 420.

In step S1002, the sending data generation unit 203 determines whether there is data corresponding to a number (product number) matching the print condition indicated by the information set in the status setting field 711 of the POP print setting screen 710.

A specific example of the processing in step S1002 will be described. The sending data generation unit 203 extracts the record corresponding to the printing apparatus 110 issuing the transmission request in step S1000 from the records of the status information 610. The store name in the status information 610 is identified from the store ID set on the server registration screen 700.

If a cross mark is registered in all the target fields of the extracted record, the sending data generation unit 203 determines that there is no data of a number (product number) matching the print condition. In such a case, the determination in step S1002 is NO. If a white circle is registered in a target field of the extracted record, the sending data generation unit 203 determines whether the record includes a number (product number) where a state corresponding to the state selected in the status setting field 711 of the POP print setting screen 710 is registered. If the extracted record does not include the number (product number) where a state corresponding to the state selected in the status setting field 711 of the POP print setting screen 710 is registered, the determination of step S1002 is NO. If not, the determination of step S1002 is YES.

If the sending data generation unit 203 thus determines that there is data of a number (product number) matching the print condition indicated by the information set in the status setting field 711 of the POP print setting screen 710 (YES in step S1002), the processing proceeds to step S1003. In step S1003, the sending data generation unit 203 determines whether there is data of a number (product number) matching the print condition indicated by the information set in the period setting field 712 of the POP print setting screen 710.

A specific example of the processing in step S1003 will be described. The sending data generation unit 203 extracts information indicating the state selected in the status setting field 711 of the POP print setting screen 710 from the information acquired in step S1001. The sending data generation unit 203 extracts a number (product number) where a state corresponding to the state selected in the status setting field 711 is registered from the record of the status information 610 extracted in step S1002. The sending data generation unit 203 then extracts the period of validity at the extracted number (product number) from the print configuration information 600. As described above, the period of validity is registered using the detailed product data registration screen 520 illustrated in FIG. 5C.

The sending data generation unit 203 then extracts the print condition (period) indicated by the information selected in the period setting field 712 of the POP print setting screen 710 from the information acquired in step S1001. The sending data generation unit 203 determines whether the period of validity extracted from the print configuration information 600 satisfies the print condition (period) indicated by the information selected in the period setting field 712 of the POP print setting screen 710. If, as a result of the determination, the period of validity extracted from the print configuration information 600 satisfies the print condition (period) indicated by the information selected in the period setting field 712 of the POP print setting screen 710, the determination of step S1003 is YES. If not, the determination of step S1003 is NO.

If the sending data generation unit 203 thus determines that there is print image data 420 matching the print condition indicated by the information set in the period setting field 712 of the POP print setting screen 710 (YES in step S1003), the processing proceeds to step S1004. In step S1004, the sending data generation unit 203 generates print image data 420 matching the print condition indicated by the information set on the POP print setting screen 710. In step S1004, the sending data generation unit 203 reads frame data based on the data of the selected number (product number), and adds information registered as the variable data to the frame data. The print image data 420 is thereby generated. The transmission unit 205 transmits the print image data 420 generated by the sending data generation unit 203 to the printing apparatus 110.

In step S1005, the reception unit 204 receives print completion information from the printing apparatus 110. The print completion information is transmitted in step S806 of FIG. 8.

In step S1006, the data distribution server 100 extracts the record corresponding to the printing apparatus 110 (store name) issuing the transmission request in step S1000 from the records of the status information 610. The data distribution server 100 then changes the state field of the number (product number) corresponding to the print image data 420 transmitted in step S1004 among the state fields of the extracted record to "printed". After the end of the processing of step S1006, the processing of the flowchart of FIG. 10 ends.

If, in step S1002 or S1003, the sending data generation unit 203 determines that there is no print image data 420 matching the print condition indicated by the information set on the POP print setting screen 710 (status setting field 711 or period setting field 712) (NO in step S1002 or S1003), the processing proceeds to step S1007. In step S1007, the transmission unit 205 transmits a response indicating that there is no data of the number (product number) where POP printing is to be performed to the printing apparatus 110. After the end of the processing of step S1007, the processing of the flowchart of FIG. 10 ends.

As described above, in the present embodiment, the data distribution server 100 manages the past records of printing of the print image data 420 by the printing apparatuses 110 to 112. The data distribution server 100 transmits print image data 420 not printed by a printing apparatus issuing a transmission request for print image data 420 among the printing apparatuses 110 to 112 to the printing apparatus, and does not transmit print image data 420 printed by the printing apparatus to the printing apparatus. The acquisition of print image data 420 intended for the printing apparatuses 110 to 112 can thus be requested from the data distribution server 100 and the print image data 420 can be printed based on operation on the printing apparatuses 110 to 112 without PC operation. The printing apparatuses 110 to 112 can thus acquire the print image data 420 to be printed by the printing apparatuses 110 to 112 without the users of the printing apparatuses 110 to 112 selecting the individual pieces of print image data 420 in issuing the requests. This can reduce the burden of the operation to be made on the printing apparatuses 110 to 112 when the printing apparatuses 110 to 112 request the print image data 420 from the data distribution server 100.

In the present embodiment, if the print image data 420 requested from the data distribution server 100 is already printed by the printing apparatuses 110 to 112, the printing apparatuses 110 to 112 display the printed notification screen 900 for the users' information. The users of the printing apparatuses 110 to 112 can thus find out whether there is no print image data 420 satisfying the print condition in the data distribution server 100 or such print data 420 is already printed by other users, for example.

In the present embodiment, the example has been described where the sending data generation unit 203 generates the print image data 420 using the frame image data 400a to 400c and the variable data 410a to 410d. However, this is not restrictive. As described above, in the present embodiment, the content to be displayed on a POP display can be identified from the frame image data 400a to 400c and the variable data 410a to 410d. The content to be displayed on a POP display can thus also be identified from the print image data 420. In the present embodiment, the print target data may be the frame image data 400a to 400c and the variable data 410a to 410d, or the print image data 420.

The data distribution server 100 may therefore store the print image data 420 itself, for example. In such a case, the data distribution server 100 does not need to store the frame image data 400a to 400c or the variable data 410a to 410d.

The data distribution server 100 may store the frame image data 400a to 400c and the variable data 410a to 410d and not generate the print image data 420. In such a case, the reception unit 204 receives a transmission request for the frame image data 400a to 400c and the variable data 410a to 410d instead of the transmission request for the print image data 420. The transmission unit 205 transmits the frame image data 400a to 400c and the variable data 410a to 410d to a printing image issuing the transmission request among the printing apparatuses 110 to 112 instead of the print image data 420. In such a case, the print image data 420 is generated by the printing apparatuses 110 to 112.

In the present embodiment, the example has been described where the data distribution server 100 determines the print image data 420 to be printed by the printing apparatuses 110 to 112. However, this is not restrictive. For example, the data distribution server 100 may transmit all the print image data 420 not printed by a printing apparatus to the printing apparatus. In performing the print processing in such a manner, the printing apparatus may determine the presence or absence of print image data 420 to be printed by the printing apparatus among the not-printed print image data 420, and print an image or images based on the print image data 420.

In performing the print processing in such a manner, the printing apparatus may acquire information for determining the presence or absence of print image data 420 to be printed by the printing apparatus among the print configuration information 600 and the status information 610 from the data distribution server 100. The printing apparatus may acquire the information based on the user's input operation on the printing apparatus. An example of the information for determining the presence or absence of print image data 420 to be printed by the printing apparatus is information about the record corresponding to the printing apparatus and the print image data 420 among the records of the status information 610. Further, the information registered in the state fields of the status information 610 can be recognized by the printing apparatus. The printing apparatus therefore does not need to acquire the information.

The data distribution server 100 may transmit the pieces of print image data 420 to the printing apparatuses 110 to 112 with additional information for determining the presence or absence of print image data 420 to be printed by the printing apparatuses 110 to 112.

As described above, the data distribution server 100 can perform processing for causing a printing apparatus requesting print image data 420 to print print image data 420 not printed by the printing apparatus without causing the printing apparatus to print print image data 420 printed by the printing apparatus.

In the present embodiment, the example has been described where the print image data 420 is directly transmitted from the data distribution server 100 to the printing apparatuses 110 to 112. However, the print image data 420 may be transmitted from the data distribution server 100 to the printing apparatuses 110 to 112 via another apparatus as long as the print image data 420 is delivered to the printing apparatuses 110 to 112.

A second embodiment will be described. If POP printing is not performed for a long period of time and then a large number of print products are output by POP printing at a time, the user has difficulty in finding out which print condition matches for each printed print product. If, for example, an instruction to perform POP printing is issued by operating a PC, details of the print condition on each piece of print image data 420 can be displayed on the PC display. By contrast, the printing apparatuses 110 to 112 have a small display compared with the PC display. If POP printing is performed by only the operation of pressing the POP print button 732, the print conditions of the respective pieces of print image data 420 are difficult to display on the displays of the printing apparatuses 110 to 112 in an easily viewable manner. The present embodiment demonstrates a case where the printing apparatuses 110 to 112 print an insert between (immediately before or immediately after) pieces of print image data 420 in printing a plurality of pieces of print image data 420 by a single POP printing operation. The present embodiment thus includes additional processing for printing an insert between the pieces of print image data 420 as compared to the first embodiment. In the description of the present embodiment, like numbers in FIGS. 1 to 10 in the first embodiment refer to like parts, and a detailed description thereof will be omitted.

Figure 11:
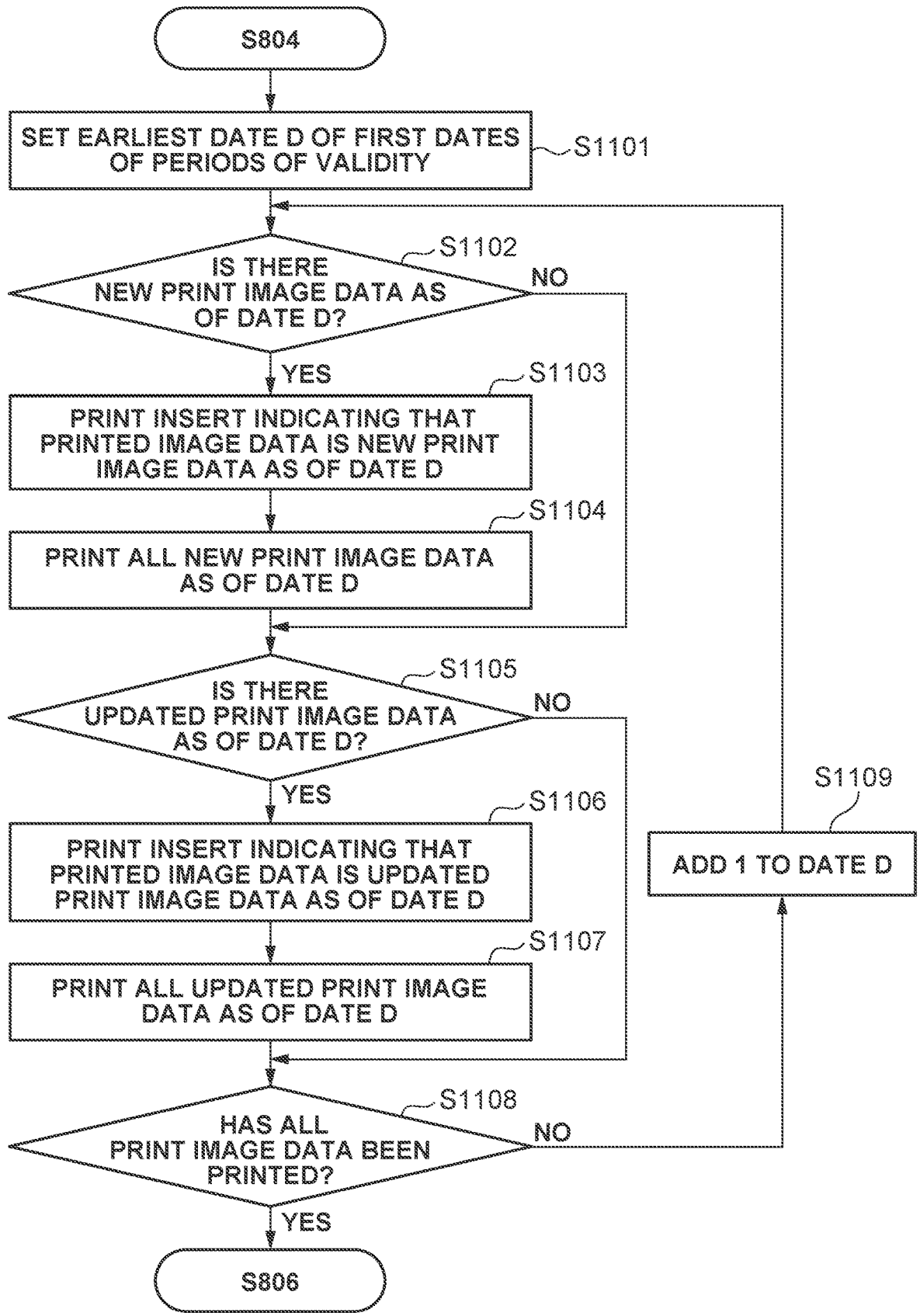
FIG. 11 is a flowchart illustrating an operation of the printing apparatus during POP printing.

FIG. 11 is a flowchart illustrating an example of an operation of the printing apparatuses 110 to 112 in performing POP printing. Again, the present embodiment demonstrates a case where the printing apparatuses 110 to 112 make the same operation in performing POP printing. The example of the operation of the printing apparatuses 110 to 112 will thus be described by using the printing apparatus 110 as an example. The processing of the flowchart of FIG. 11 is processing to be performed in step S805 of FIG. 8. The present embodiment demonstrates a case where the processing of step S805 in FIG. 8 is replaced with the processing of the flowchart of FIG. 11. The present embodiment also demonstrates a case where the information about the states and the periods of validity of the print image data 420 are added to the respective pieces of print image data 420 transmitted in step S1004 of FIG. 10.

In step S1101, the printing apparatus 110 initially sets the earliest date D of the first days of the periods of validity added to the print image data 420 received in step S804.

In step S1102, the printing apparatus 110 determines whether the print image data 420 received in step S804 includes new print image data 420 as of the date D. The new print image data 420 as of the date D refers to print image data 420 that corresponds to a POP display to be installed in the store on the date D and is newly generated by the data distribution server 100. Specifically, the new print image data 420 as of the date D refers to print image data 420 of which the first day of the period of validity is the date D and the state is "not printed". If, as a result of the determination, there is no new print image data 420 as of the date D (NO in step S1102), the processing proceeds to step S1105, which will be described below.

On the other hand, if there is new print image data 420 as of the date D (YES in step S1102), the processing proceeds to step S1103. In step S1103, the printing apparatus 110 generates image data indicating that the printed print image data 420 is the new print image data 420 as of the date D in a text format, and prints the image data as an insert.

In step S1104, the printing apparatus 110 prints an image based on the new print image data 420 as of the date D. If there is a plurality of pieces of new print image data 420 as of the date D, the printing apparatus 110 prints all the plurality of pieces of print image data 420 at a time.

In step S1105, the printing apparatus 110 determines whether the print image data 420 received in step S804 includes updated print image data 420 as of the date D. The updated print image data 420 as of the date D refers to print image data 420 that corresponds to a POP display to be installed in the store on the date D and is updated by the data distribution server 100.

Specifically, the updated print image data 420 as of the date D refers to print image data 420 of which the first day of the period of validity is the date D and the state is "updated". If, as a result of the determination, there is no updated print image data 420 as of the date D (NO in step S1105), the processing proceeds to step S1108, which will be described below.

On the other hand, if there is updated print image data 420 as of the date D (YES in step S1105), the processing proceeds to step S1106. In step S1106, the printing apparatus 110 generates image data indicating that the printed print image data 420 is the updated print image data 420 as of the date D in a text format, and prints the image data as an insert.

In step S1107, the printing apparatus 110 prints an image based on the updated print image data 420 as of the date D. If there is a plurality of pieces of updated print image data 420 as of the date D, the printing apparatus 110 prints all the plurality of pieces of print image data 420 at a time.

In step S1108, the printing apparatus 110 determines whether all the print image data 420 received in step S804 has been printed. If, as a result of the determination, all the print image data 420 received in step S804 has been printed (YES in step S1108), the processing of the flowchart of FIG. 11 ends. In such a case, the processing of step S806 in FIG. 8 is performed.

On the other hand, if all the print image data 420 received in step S804 has not been printed (NO in step S1108), the processing proceeds to step S1109. In step S1109, the printing apparatus 110 adds 1 to the date D. The processing returns to step S1102.

As described above, in the present embodiment, if a plurality of pieces of print image data 420 is printed by a single POP print operation, the printing apparatuses 110 to 112 output an insert displaying the information about the print conditions between the pieces of print image data 420. If, for example, a plurality of print products as of different dates is POP printed at a time or print products under conditions of different printing states are POP printed at a time, the users can thus easily find out what kind of print product each print product is without using a PC display.

In the present embodiment, the example has been described where the printing apparatuses 110 to 112 print the information about the print condition on an insert. However, the information to be printed on an insert is not limited to the information about the print condition described in the present embodiment, as long as the information helps the user distinguish the pieces of print image data 420 printed before and after the insert. While the information about the print condition is desirably printed on an insert, an insert may be a blank sheet (sheet with no information displayed). The reason is that the pieces of print image data 420 to be printed (installed in the store) on different dates can be distinguished by the user, for example. Furthermore, various modifications described in the first embodiment may also be employed in the present embodiment.

A third embodiment will be described. In the present embodiment, an example of the notification prompting POP printing, mentioned in the first embodiment will be described in detail. In the present embodiment, an example of the processing performed in response to the notification prompting POP printing, mentioned in the first embodiment will also be described in detail. In the description of the present embodiment, parts similar to those of the first and second embodiments are therefore denoted by the same reference numerals as those in FIGS. 1 to 11, and a detailed description thereof will be omitted.

In the first embodiment, the example has been described where the notification prompting POP printing is issued by the light emission from the LED or the sound emission from the buzzer. However, the methods for issuing the notification prompting POP printing are not limited thereto.

The notification prompting POP printing can be issued by using an email, by printing the content of the notification, or by other methods.

Figure 12:
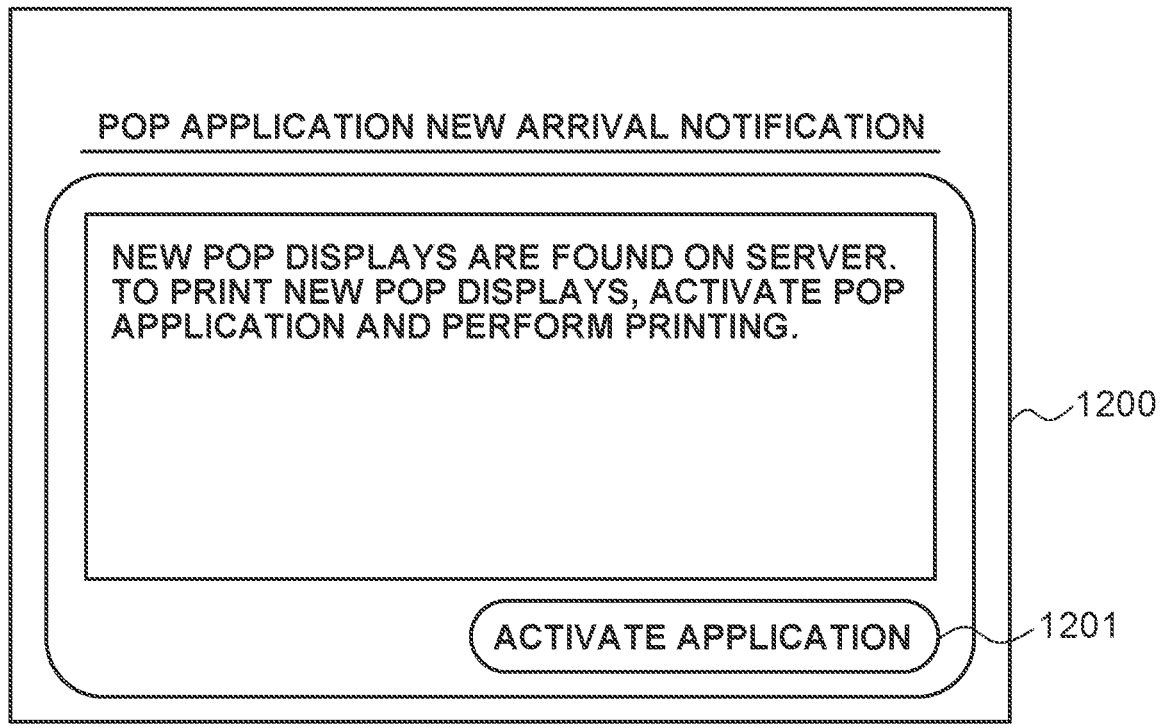
FIG. 12 is a diagram illustrating an example of an unprinted notification screen.

FIG. 12 is a diagram illustrating an example of an unprinted notification screen 1200. The unprinted notification screen 1200 is an example of a screen for issuing the notification prompting POP printing. The unprinted notification screen 1200 is a GUI displayed on the printing apparatuses 110 to 112 (computer display included in the operation unit 305).

The unprinted notification screen 1200 is displayed when the option to issue a notification prompting POP printing is selected (enabled) in the notification setting field 721 illustrated in FIG. 7C. If POP printing is determined to be performed, the user operates the operation unit 305 to press an activation button 1201. The activation button 1201 has the same function as that of the POP print button 732 illustrated in FIG. 7D. If the activation button 1201 is pressed, print image data 420 matching the print condition on the printing apparatus 110, 111, or 112 is transmitted from the data distribution server 100 to the printing apparatus 110, 111, or 112 as described in the first and second embodiments.

Figure 13:
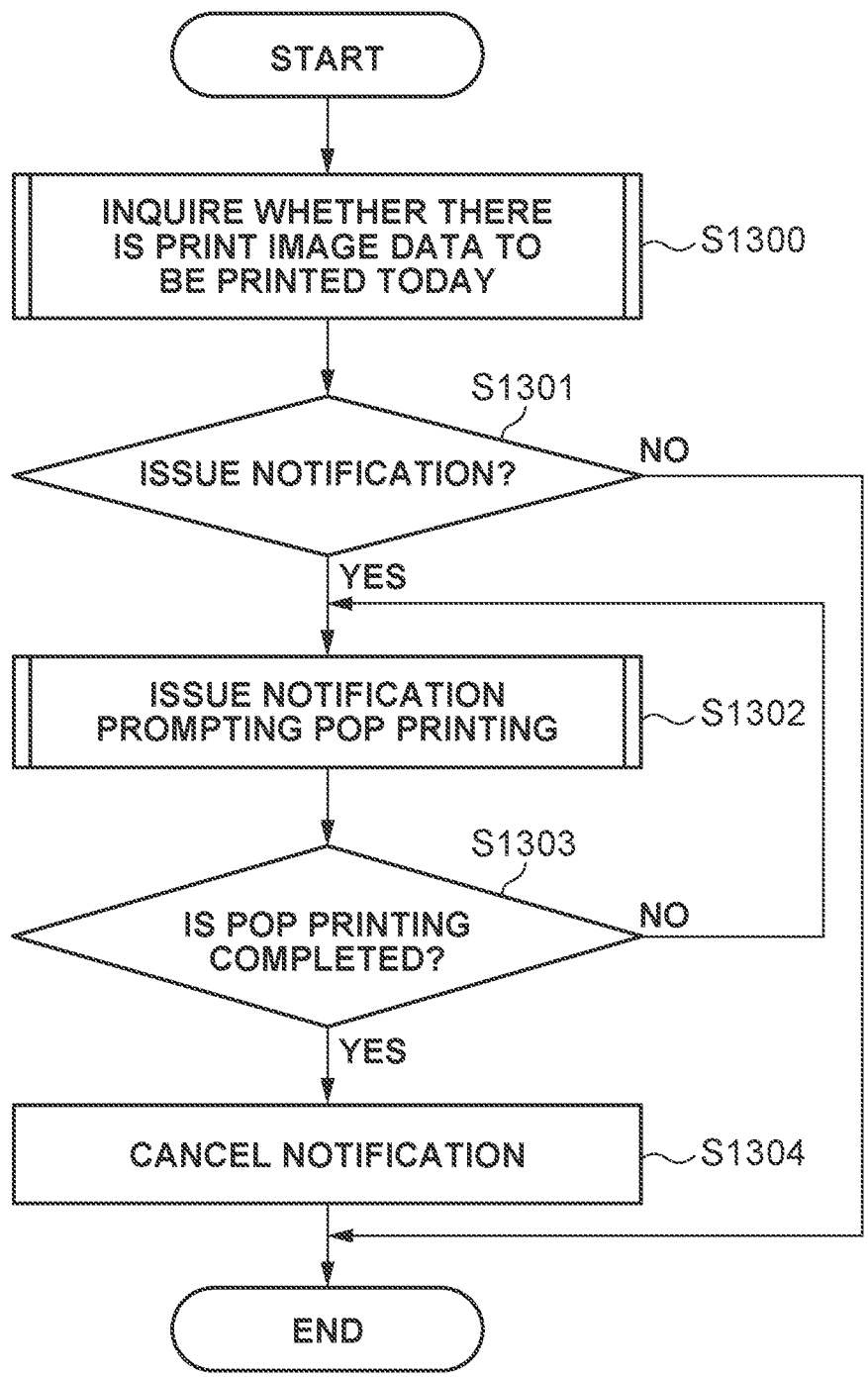
FIG. 13 is a flowchart illustrating an operation of the printing apparatus in issuing a notification prompting POP printing.

FIG. 13 is a flowchart illustrating an example of an operation of the printing apparatuses 110 to 112 in issuing a notification prompting POP printing. The present embodiment demonstrates a case where the printing apparatuses 110 to 112 make the same operation in issuing the notification prompting POP printing. The example of the operation of the printing apparatuses 110 to 112 in issuing the notification prompting POP printing will thus be described by using the printing apparatus 110 as an example. For example, the processing in the flowchart of FIG. 13 is performed by the CPU 301 running a computer program related to the execution of POP printing, using the RAM 303.

The printing apparatus 110, when powered on, starts a timer for regular polling to the data distribution server 100. A timer interrupt occurs each time a predetermined time elapses, and the processing of the flowchart of FIG. 13 is started.

In step S1300, the printing apparatus 110 inquires of the data distribution server 100 whether there is print image data 420 to be printed today. The printing apparatus 110 also transmits the store ID set in the store information input field 702 illustrated in FIG. 7A to the data distribution server 100. An example of an operation of the data distribution server 100 upon reception of the inquiry will be described below with reference to FIG. 15.

In step S1301, the printing apparatus 110 determines whether to issue a notification prompting POP printing based on a response from the data distribution server 100. If, as a result of the determination, the printing apparatus 110 determines to not issue the notification prompting POP printing (NO in step S1301), the processing of the flowchart of FIG. 13 ends. On the other hand, if the printing apparatus 110 determines to issue the notification prompting POP printing (YES in step S1301), the processing proceeds to step S1302.

In step S1302, the printing apparatus 110 issues the notification prompting POP printing by the method(s) enabled on the notification setting screen 720 illustrated in FIG. 7C. Examples of details of step S1302 will be described below with reference to FIG. 14. FIG. 7C illustrates the case where the methods for issuing the notification prompting POP printing use an LED and a buzzer. However, as described above, other methods may be used to issue the POP printing, like displaying the unprinted notification screen 1200 illustrated in FIG. 12.

After the issuance of the notification prompting POP printing, the user operates the operation unit 305 to press the POP print button 732 on the home screen 730 or the activation button 1201 on the unprinted notification screen 1200, whereby an instruction to perform POP printing is issued. In step S1303, the printing apparatus 110 determines whether the POP printing is completed. If, as a result of the determination, the POP printing is not completed (NO in step S1303), the processing returns to step S1302.

On the other hand, if the POP printing is completed (YES in step S1303), the processing proceeds to step S1304. In step S1304, the printing apparatus 110 cancels the notification prompting POP printing. After the end of the processing of step S1304, the processing of the flowchart of FIG. 13 ends.

FIG. 14 is a flowchart illustrating details of an example of the processing of step S1302. Here, the example of the processing of step S1302 will be described in detail by using the case where the methods for issuing the notification prompting POP printing are the light emission from the LED and the sound emission from the buzzer as an example.

In step S1400, the printing apparatus 110 determines whether the option to issue the notification prompting POP printing by the light emission from the LED or the sound emission from the buzzer is set. Specifically, the printing apparatus 110 determines whether "enabled" is input to the notification setting field 721 and "enabled" is input to either of the notification method setting fields 722 and 723.

If, as a result of the determination, the option to issue the notification prompting POP printing by the light emission from the LED or the sound emission from the buzzer is not set (NO in step S1400), the processing of the flowchart of FIG. 14 ends. On the other hand, if the option to issue the notification prompting POP printing by the light emission from the LED or the sound emission from the buzzer is set (YES in step S1400), the processing proceeds to step S1401. In step S1401, the printing apparatus 110 determines whether the notification unit 308 is in a sleep state. The present embodiment demonstrates a case where the possible operation states of the printing apparatus 110 include a standby state and the sleep state. The standby state refers to a state where the components, such as the CPU 301, the operation unit 305, and the notification unit 308, are operable. The sleep state refers to a state where the components other than the CPU 301 are powered off or in a power saving state and not operable. The printing apparatus 110 automatically transitions from the standby state to the sleep state if no user operation is made on the printing apparatus 110 for a certain time.

If, as a result of the determination, the printing apparatus 110 is not in the sleep state (NO in step S1401), the processing proceeds to step S1403. On the other hand, if the printing apparatus 110 is in the sleep state (YES in step S1401), the processing proceeds to step S1402. In step S1402, the printing apparatus 110 performs sleep recovery processing to operate the notification unit 308.

In step S1403, the printing apparatus 110 issues the notification prompting POP printing by the method enabled in the notification method setting field(s) 722 and/or 723. After the end of the processing of step S1403, the processing of the flowchart of FIG. 14 ends.

FIG. 15 is a flowchart illustrating an example of an operation of the data distribution server 100 upon reception of the inquiry from one of the printing apparatuses 110 to 112 in step S1300. The present embodiment demonstrates a case when the operation of the data distribution server 100 upon reception of the inquiry in step S1300 is the same regardless of which the printing apparatus is, the printing apparatus 110, 111, or 112. The example of the operation of the data distribution server 100 upon reception of the inquiry in step S1300 will thus be described by using the printing apparatus 110 as an example. For example, the processing in the flowchart of FIG. 15 is performed by the CPU 211 running a program related to the response upon reception of the inquiry in step S1300, using the RAM 213.

In step S1500, the reception unit 204 receives the inquiry about the presence or absence of print image data 420 of a number (product number) to be printed today from the printing apparatus 110.

In step S1501, the reception unit 204 receives the store ID set in the store information input field 702 illustrated in FIG. 7A from the printing apparatus 110.

In step S1502, the data distribution server 100 extracts the record including the store name corresponding to the store ID received in step S1501 from the records of the status information 610. The data distribution server 100 then determines whether there is a number (product number) to be printed based on the state fields of the extracted record. The determination in step S1502 is made based on the information set in the status setting field 711 illustrated in FIG. 7B. If "print only newly added print image data" is selected in the status setting field 711, the data distribution server 100 determines whether there is data of a number (product number) where the state is "not printed" in the status information 610. On the other hand, if "print newly added print image data and updated print image data" is selected in the status setting field 711, the data distribution server 100 determines whether there is data of a number (product number) where the state is "not printed" or "updated" in the status information 610.

If, as a result of the determination, there is no data of a number (product number) determined to be printed based on the states in the extracted record (NO in step S1502), the notification prompting POP printing does not need to be issued and the processing proceeds to step S1505. In step S1505, the transmission unit 205 transmits information indicating that the notification prompting POP printing does not need to be issued to the printing apparatus 110. After the end of the processing of step S1505, the processing of the flowchart of FIG. 15 ends.

On the other hand, if there is data of a number (product number) determined to be printed based on the states in the extracted record (YES in step S1502), the processing proceeds to step S1503. In step S1503, the data distribution server 100 determines whether the first day of the period of validity of the print image data 420 corresponding to the data of the number (product number) determined to be printed based on the states in the extracted record is the day of printing (current date) or earlier. The period of validity is identified from the period of validity included in the print configuration information 600.

In the present embodiment, the example has been described where the data distribution server 100 determines in step S1503 whether the first day of the period of validity corresponding to each number (product number) is the current date or earlier.

However, this is not restrictive. For example, if "print POP display(s) matching the update condition and prior to N days before or within the period of validity" is selected in the period setting field 712 illustrated in FIG. 7B, the following processing can be performed in step S1503. The data distribution server 100 initially determines the date N days before the first day of the period of validity corresponding to the data of each number (product number). The data distribution server 100 determines whether the determined date is before the current date.

If, as a result of the determination, the first day of the period of validity of the print image data 420 is not the day of printing or earlier (NO in step S1503), the notification prompting POP printing is not needed and the processing proceeds to step S1505. On the other hand, if the first day of the period of validity of the print image data 420 is the day of printing or earlier (YES in step S1503), the processing proceeds to step S1504. In step S1504, the transmission unit 205 transmits information indicating that the notification prompting POP printing is to be issued to the printing apparatus 110. After the end of the processing of step S1504, the processing of the flowchart of FIG. 15 ends.

As described above, in the present embodiment, the printing apparatuses 110 to 112 regularly inquire of the data distribution server 100 about the presence or absence of unprinted print image data 420. If there is print image data 420 to be printed today by the inquiring printing apparatus among the printing apparatuses 110 to 112, the data distribution server 100 notifies the printing apparatus of the presence of the print image data 420, and the printing apparatus informs the user of the presence of the print image data 420. The users of the printing apparatuses 110 to 112 can thus find out the presence of print image data 420 to be printed by the respective printing apparatuses 110 to 112 without PC operation.

In the present embodiment, the example has been described where the processing of the flowchart of FIG. 13 is started each time a predetermined time elapses. However, the timing to start the processing of the flowchart of FIG. 13 may be irregular. For example, the processing of the flowchart of FIG. 13 can be started when the users make a predetermined operation corresponding to the printing apparatuses 110 to 112.

Various modifications described in the first and second embodiments may also be employed in the present embodiment.

Other Exemplary Embodiments

An embodiment of the present disclosure can also be implemented by processing for supplying a program for implementing one or more functions of the foregoing embodiments to a system or an apparatus via a network or a storage medium, and reading and running the program by one or more processors in a computer of the system or apparatus. A circuit for implementing one or more functions (for example, ASIC) can also be used for implementation.

All the embodiments of the present disclosure described above are merely examples of embodiment in carrying out the present disclosure, and the technical scope of the present disclosure should not be interpreted as limited thereto. In other words, an embodiment of the present disclosure can be practiced in various forms without departing from the technical concept or essential features thereof.

According to an embodiment of the present disclosure, the burden of operation to be made on a printing apparatus when the printing apparatus requests data to be printed from a server can be reduced.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-134077, filed Aug. 25, 2022, which is hereby incorporated by reference herein in its entirety.

What is claimed is:

1. A printing apparatus comprising:
a controller,
wherein the controller acquires first print target data and second print target data transmitted from a server,
wherein a first date of a first period of validity set on the first print target data is different from a first date of a second period of validity set on the second print target data,
wherein the first period is a period in which an advertisement printed based on the first print target data is to be posted in a store, and
wherein the second period is a period in which an advertisement printed based on the second print target data is to be posted in the store; and
a printer,
wherein the printer prints, based on an instruction for printing the acquired first print target data and the acquired second print target data, the acquired first print target data, the acquired second print target data and inserting data indicating the first date of the first period of validity set on the first print target data, and wherein the printer prints the inserting data before the printer prints the second print target data after the printer prints the first print target data.

2. The printing apparatus according to claim 1, wherein the advertisement printed based on the first print target data and the advertisement printed based on the second print target data are Point of Purchase Advertising.

3. The printing apparatus according to claim 1, wherein the inserting data is not data that is received from the server.

4. The printing apparatus according to claim 3, wherein the inserting data is generated by the printing apparatus.

5. The printing apparatus according to claim 1, further comprising:
- a display,
- wherein the display displays a notification indicating that print target data acquired by the controller is not printed.

6. The printing apparatus according to claim 1,
- wherein the controller issues a request for acquisition of print target data to the server, and
- wherein the controller acquires the first print target data and the second print target data transmitted from the server based on the request by the controller.

7. The printing apparatus according to claim 1, wherein the controller returns from a power saving state on the basis that the controller acquires the first print target data and the second print target data from the server in a state that the printing apparatus is in the power saving state.

8. A printing method comprising:
- acquiring first print target data and second print target data transmitted from a server, wherein a first date of a first period of validity set on the first print target data is different from a first date of a second period of validity set on the second print target data,
- wherein the first period is a period in which an advertisement printed based on the first print target data is to be posted in a store, and
- wherein the second period is a period in which an advertisement printed based on the second print target data is to be posted in the store; and
- printing, based on an instruction for printing the acquired first print target data and the acquired second print target data, the acquired first print target data, the acquired second print target data and inserting data indicating the first date of the first period of validity set on the first print target data,
- wherein the inserting data is printed before the second print target data is printed after the first print target data is printed.

* * * * *